US010868865B2

(12) United States Patent
Shadmon et al.

(10) Patent No.: US 10,868,865 B2
(45) Date of Patent: Dec. 15, 2020

(54) SYSTEM AND APPARATUS TO MANAGE DATA USING A PEER-TO-PEER NETWORK AND THE BLOCKCHAIN

(71) Applicants: Moshe Shadmon, Redwood City, CA (US); Levy Cohen, Tel Aviv (IL); Daniel Abadi, College Park, MD (US); Owen Arden, Santa Cruz, CA (US)

(72) Inventors: Moshe Shadmon, Redwood City, CA (US); Levy Cohen, Tel Aviv (IL); Daniel Abadi, College Park, MD (US); Owen Arden, Santa Cruz, CA (US)

(*) Notice: Subject to any disclaimer, the term of this patent is extended or adjusted under 35 U.S.C. 154(b) by 263 days.

(21) Appl. No.: 16/196,668

(22) Filed: Nov. 20, 2018

(65) Prior Publication Data

US 2019/0158594 A1 May 23, 2019

Related U.S. Application Data

(60) Provisional application No. 62/722,484, filed on Aug. 24, 2018, provisional application No. 62/669,523, filed on May 10, 2018, provisional application No. 62/588,692, filed on Nov. 20, 2017.

(51) Int. Cl.
*H04L 29/06* (2006.01)
*H04L 29/08* (2006.01)
(Continued)

(52) U.S. Cl.
CPC .......... *H04L 67/1097* (2013.01); *G06F 16/20* (2019.01); *G06F 16/2471* (2019.01);
(Continued)

(58) Field of Classification Search
CPC ... H04L 67/1097; H04L 9/0819; H04L 9/088; H04L 67/42; G06F 16/2471; G06F 16/20
See application file for complete search history.

(56) References Cited

U.S. PATENT DOCUMENTS 10,114,969 B1 * 10/2018 Chaney ................ H04L 9/3247
2015/0142733 A1   5/2015 Shadmon
(Continued)

FOREIGN PATENT DOCUMENTS

EP     3 236 374 A1      10/2017
WO   2014/035879 A2      3/2014

OTHER PUBLICATIONS

Rouse, Margaret. "internet of things (IoT)." TechTarget, TechTarget, published circa Mar. 2016, last edited Jun. 29, 2018, retrieved Feb. 6, 2019, https://internetofthingsagenda.techtarget.com/definition/Internet-of-Things-IoT?vgnextfmt=print.
(Continued)

*Primary Examiner* — Shin-Hon (Eric) Chen
(74) *Attorney, Agent, or Firm* — Oliff PLC

(57) ABSTRACT

A method of answering a data request directed to a network of distributed servers includes receiving the data request from a client at a server. The method further includes extracting identifying information of requested data in the data request, using the server. The method further includes obtaining location information of the requested data indicating which of the distributed servers is storing the requested data, by comparing the identifying information to a distributed ledger. The method further includes sending the requested data from the server to the client.

3 Claims, 8 Drawing Sheets

(51) Int. Cl.
*G06F 16/2458* (2019.01)
*G06F 16/20* (2019.01)
*H04L 9/08* (2006.01)

(52) U.S. Cl.
CPC ............ *H04L 9/088* (2013.01); *H04L 9/0819* (2013.01); *H04L 67/42* (2013.01)

(56) References Cited

U.S. PATENT DOCUMENTS

| | | | |
|---|---|---|---|
| 2016/0253382 A1 | 9/2016 | Shadmon | |
| 2017/0031676 A1* | 2/2017 | Cecchetti | H04L 9/3236 |
| 2017/0323294 A1* | 11/2017 | Rohlfing | G06Q 20/065 |
| 2017/0344435 A1* | 11/2017 | Davis | G06F 16/9535 |
| 2018/0117447 A1* | 5/2018 | Tran | G16H 80/00 |
| 2018/0313798 A1* | 11/2018 | Chokshi | G01D 9/005 |
| 2018/0315309 A1* | 11/2018 | Becker | H04L 9/0643 |
| 2018/0337769 A1* | 11/2018 | Gleichauf | G06Q 20/065 |
| 2020/0272755 A1* | 8/2020 | Soundararajan | G06Q 20/06 |

OTHER PUBLICATIONS

"Representational state transfer." Wikipedia, Wikimedia Foundation, published Aug. 17, 2004, last edited Jan. 19, 2019, retrieved Feb. 6, 2019, https://en.wikipedia.org/wiki/Representational_state_transfer.

"Colored Coins." Bitcoin Wiki, Bitcoin Wiki, published Jul. 7, 2015, last edited Nov. 2, 2015, retrieved Feb. 6, 2019, https://en.bitcoin.it/wiki/Colored_Coins.

Van de Sande, Alex. "Ethereum in practice part 1: how to build your own cryptocurrency without touching a line of code." Ethereum, Ethereum Foundation, published Dec. 3, 2015, retrieved Feb. 6, 2019, https://blog.ethereum.org/2015/12/03/how-to-build-your-own-cryptocurrency/.

"Technical Introduction to Events and Logs in Ethereum." ConsenSys, ConsenSys, published Jun. 6, 2016, retrieved Feb. 6, 2019, https://media.consensys.net/technical-introduction-to-events-and-logs-in-ethereum-a074d65dd61e.

"ERC20 Token Standard." The Ethereum Wiki, The Ethereum Wiki, published Feb. 16, 2017, last edited Dec. 4, 2018, retrieved Feb. 6, 2019, https://theethereum.wiki/w/index.php/ERC20_Token_Standard.

"User Wallet Credit System [Details]." WordPress, Dash10 Digital, published circa Jan. 2015, last edited circa Feb. 2018, retrieved Feb. 6, 2019, https://wordpress.org/plugins/user-waller-credit-system/.

Feb. 1, 2019 Invitation to Pay Additional Search Fee Issued in International Patent Application No. PCT/US2018/062034.

Mar. 25, 2019 International Search Report and Written Opinion of the International Searching Authority Issued in International Patent Application No. PCT/US2018/062034.

\* cited by examiner

FIG. 4

| Time | Displ. | Temp. | Hmdt. |
|---|---|---|---|
| 2017-01-26T20:47:53.0000000 | MeterA | 123 | 23 |

FIG. 5

| Time | Displ. | Temp.<br>Temperature | Hmdt. |
|---|---|---|---|
| 2017-01-26T20:47:53.0000000 | MeterA | 123 | 23 |
| 2017-01-26T20:47:54.0000000 | MeterB | 82 | 30 |

FIG. 6

| Log ID | Device ID | Start Time | End Time | Table | Contractor |
|---|---|---|---|---|---|
| L1 | X1 | T1 | T2 | TABLE1 | C1 |

| TYPE OF RELATION | TYPE OF REPRESENTATION | ADDITIONAL INFO |
|---|---|---|
| TABLE → LOG FILE | LIST OF FILES MAKING THE TABLE DATA | SOURCE (DEVICE ID), TIME INTERVAL |
| TABLE → USER | PERMISSION GRANT | PER GRANT INFO |
| TABLE → GROUP | PERMISSION AT A GROUP LEVEL | |
| GROUP → USER | USER INHERITS GROUP PERMISSION | |
| LOG FILE → CONTRACTOR | STORAGE LOCATION | STORAGE DURATION, SLA |
| TABLE → COLUMN | DESCRIBE SCHEMA | COLUMN NUMBER, DATA TYPE, DEFAULT VALUE |

FIG. 8

SYSTEM AND APPARATUS TO MANAGE DATA USING A PEER-TO-PEER NETWORK AND THE BLOCKCHAIN

CROSS-REFERENCE

This application claims priority to U.S. Provisional Application No. 62/588,692, filed Nov. 20, 2017, U.S. Provisional Application No. 62/669,523, filed May 10, 2018, and U.S. Provisional Application No. 62/722,484, filed Aug. 24, 2018. The contents of the above applications are incorporated herein by reference in their entirety.

TECHNICAL FIELD

This disclosure relates to management of log data, distribution of data, time series data, databases and database management systems, decentralized management of data, and blockchain technology and cryptocurrencies.

BACKGROUND

The "world wide web" has had an extraordinary impact on our day-to-day lives. An enormous amount of information is available to any participant at extremely low cost (usually this cost is paid via one's attention to advertisements). However, the interface to the Internet is fundamentally flawed. You either need to have pre-existing knowledge of the location of the information that you need (e.g. knowing the correct URL), or you use a search interface which generally attempts to match words in a search query with the natural language found on the web. It is totally impossible to query the entire Internet with a single SQL query (or any other structured query language), and even if you could, the data available on the WWW is not published in a format which would be amenable to such queries.

According to IDC's annual Digital Universe study, it is predicted that, by 2020, the amount of data in the world would be the amount of 44 zettabytes, a 10-fold growth from 2014. The so-called internet of things, will account for about 10% of data on earth whereas key predictions show that by 2020, one tenth of the world's data will be produced by machines; and that the amount of data will increasingly outpace available storage.

The Internet of Things (IoT) has not been around for very long. However, there have been visions of machines communicating with one another since the early 1800s. Machines have been providing direct communications since the telegraph (the first landline) was developed in the 1830s and 1840s.

The IoT is a dynamic and global network infrastructure, in which "Things" (individual physical and virtual entities and subsystems) generate data and are expected to communicate among themselves and with other processes. As connected sensors become more intelligent, the data they generate becomes increasingly important to every aspect of business. From monitoring machines on the factory floor to tracking the progress of ships at sea, sensors can help companies get far more out of their physical assets— improving the performance of machines, extending their lives, and learning how they could be redesigned to do even more.

In the context of IoT, a data management platform collects, stores, processes, queries and analyzes the data generated from smart meters, devices and processes to enable many types of applications and services that leverage the data for many purposes such as for control, monitoring, analysis, predictive maintenance and analytics.

BRIEF SUMMARY

Traditionally, data management was treated differently for the next to real time tasks that were done by individual tailored processes at the edges in the form of control and monitor systems and tasks such as analysis of the data that were supported by a backend centralized database. However, the increase in IoT devices and data volume and the distinctive characteristics of the generated data makes the management of the data difficult and expensive.

For the real-time requirements, the amount and diversity of the data is such that existing systems have difficulty addressing the growth:
a. The amounts of data at the edges push the existing systems to their limits.
b. The diversity of data as well as new smart devices being added at the edges daily, prevent a simple integration to the existing systems.

For analytics, relational-based or other centralized databases have drawbacks:
a. It is a massive volume of heterogeneous, streaming and geographically-dispersed real-time data that is created by millions of diverse devices.
b. It is a non-static data as it represents registration of events in time context. This is different from what traditional databases are optimized for.
c. As it is originated from different devices of different manufacturers such that it has less structure than expected.

Embodiments herein overcome the above-mentioned limitations. Embodiments herein present a decentralized data management framework for IoT. In this framework, data is organized in log files which are stored on a network of machines next to where the data was generated. A metadata layer provides context to the data and queries are satisfied in a unified and cost-efficient way by creating an ad hoc, peer-to-peer (p2p) database to each query.

This approach facilitates efficient management of huge amounts of data. In this approach, data is not transferred to data centers, queries are only evaluating subsets of data such that data growth has a small impact on the performance and scalability, data is treated as self-describing data such that transformations of the data are minimized, and it operates in next to real time as data can be queried when it becomes available at the edges.

Embodiments herein organize data and satisfy queries over the data. This is done by creating a peer to peer connection between different members of a network and transferring the data between the members. Examples of the setup and how these processes are used are as follows:
 1. The data generated by a smart meter is collected by a computer. The computer can be of any type, for example a Raspberry Pi configured with the Linux operating system. The computer collecting the data organizes the data as a log file and transfers the data to one or more computer servers on the network. These computers servers can be Intel based with the Linux or Windows operating system. This is done by creating a peer to peer connection between the raspberry Pi and computer servers and transferring a newly created log file to the one or more servers in the network. This process distributes data from many smart meters to many servers on the network. By distributing the data in this manner, each of these servers maintains one or more log files and each log file represents readings of a particular time interval from a smart meter. The log files can be managed by a local database on the servers such that each server can efficiently satisfy queries over the data it maintains.

2. The Raspberry Pi of the example is connected as a node on a blockchain network. The network can be the Ethereum network. Said Raspberry Pi maintains software that can retrieve information from the blockchain and update the blockchain. Retrieval is done from a local copy of the blockchain. Said local copy does not need to include all the data of the blockchain as only the data relevant to the distribution of the log files is needed. Updates are promoted to peer nodes in the blockchain network using the blockchain mechanisms.

3. A user interacts with a user terminal. The user issues a query to the terminal. The query is processed by a computer connected to the terminal. This computer can be Intel based configured with the Linux or Windows operating system. The query process first interacts with a metadata layer that provides information needed to correctly process the query. For example, the metadata layer can determine which members maintain the log files that are needed to be considered in order to satisfy the query. The query process creates a peer to peer connection between the computer receiving the query from the user terminal and the identified servers that maintain the log files and are needed to satisfy the query. Using the created connection, the query, or a derived query, is transferred to the identified servers that process the query over the log files. Each server returns data (representing the query results over the log files considered by the server) to the computer supporting the user terminal. Then, the computer unifies the returned data from all the servers and organizes the data in some user readable format that is send and displayed on the user terminal.

4. In a different setup, the query was sent to a computer from an application using a REST API. More information on REST is available here—https://en.wikipedia.org/wiki/Representation_state_tranfer.
    a. The query may be expressed in JSON format. When the computer receives the result sets from each of the servers maintaining the log files that need to be considered, a unified result in JSON format is organized and transferred by the computer to the application using the REST API
    b. The query may be expressed in SQL format. When the computer receives the result sets from each of the servers maintaining the log files that need to be considered, a unified result is organized and transferred by the computer to the application that issued the query. The transfer of the SQL query and the returned results can be done using a JDBC interface.

5. The members of the network share a metadata layer. This layer acts as a registry that provides information describing the data managed by the network and the information describing the members. For example, the list of tables, the schema of each table, the data types, distribution of the data in the network, the IP address/port information of members that service the data, the type of service that each member offers and the price, access control information and members permissions. Examples of how the metadata layer is used:
    a. Given a log file—the metadata determines the list of members registered to service data and the type of service and price they offer.
    b. Given a query, the metadata determines which members maintain the log files that are needed to be considered in order to satisfy the query.
    c. Given a user, the metadata determines the permissions provided to the user.

The metadata serves like the metadata layer of a database and contains all information typically stored in a catalog on a traditional database system that describe the data being stored and important statistics about that the data that are leveraged during query planning and optimization. The metadata can be organized and managed in many ways. For example, it can be managed by a local database, such as PostgreSQL maintained on the local machine, or by a remote database or service on a remote machine, or the metadata information is detailed in a blockchain, or the metadata is available by a service or a process or a location identified by the information contained in the blockchain. Or a combination of the above. For example, for a given table, the schema of the table is maintained by members that are identified by information contained in the blockchain whereas each identified member maintains the schema on a local database.

6. To make the processing of the metadata information efficient, members can maintain a local copy of the metadata on their local machines. For example, if metadata information is in the blockchain, members can synchronize a local copy of the blockchain with updates of the blockchain. Said local copy does not need to include all the metadata as only the data relevant to the member is needed. For example, a member that issues queries only needs to maintain the metadata of the tables he is interested to query and only if he maintains the permissions to access the data.

7. In a particular embodiment, members of the network are nodes on a blockchain network. The network can be the Ethereum network. By becoming members of the blockchain network, the information contained in the blockchain is available from which the metadata information can be located. The said metadata is used to facilitate the functionalities provided by the members of the network.

Introduced herein is a new world wide web for structured data (e.g., data that fits in rows and columns of relational tables), with a specific initial focus on IoT data. Anybody can publish structured data to the network, published according to their preferred schema, and publishers retain the ability to specify the permissions of their published data. Some data will be published with open access—in which case it will be queryable by any user of the network. Other data will be published and protected by a key, in which case only users with access to the key may query it.

Users are presented with a number of potential schemas or create their own schemas to use per application space. A user chooses a schema, and sends SQL queries written using this schema for query processing. The processes queries the entire set of data published in the network that was published using that schema, and for which the user who issued the query has access to. The results are combined, aggregated, and returned to the user.

Financial incentives are critical for the proper functioning of the system and there are multiple ways to incentivize members of the network. Some examples are the following:
    a) Publishers of data provide financial rewards to members that store data.
    b) Members that store data receive financial reward every time they process a query.

c) Publishers receive financial reward every time the data that they contributed participates in a query result. This reward accomplishes three important goals:
   (1) It motivates data owners to contribute their data to the platform
   (2) It motivates data owners to make their data public (since public data will be queried more often than private data).
   (3) It motivates data owners to use an existing schema to publish their data (instead of creating a new schema).
d) Members offer free storage when the incentives provided to them when queries are processed provide sufficient incentives.
e) Members offer free storage and share query rewards with publishers.

In one embodiment, querying the system requires a small payment of tokens. These payment tokens are shared (according to a prearranged contract) between members of the network that contributed the data being queried and the members that processed the query. For example, the publishers who publish the data that was queried and the "contractors" that provide the storage and computational power necessary for the successful processing of queries over that data are rewarded by a member that issued a query. The methods and terms of payments are determined by the members of the network and are enforced through smart contracts. For example, a publisher of data can approach the network asking contractors to bid on the needed Service Level Agreement (SLA). A micropayment implementation of Blockchain enables the exchange of the small forms of payment for storage and queries without requiring any trust between the query participants, the contractor participants, and the producer/publisher participants. Thus, there is provided an extremely powerful query interface to the entire wealth of data produced by IoT devices. Questions such as: "What was the average temperature of all outdoor temperature sensors in Palo Alto on Jun. 21, 2008?" or "What was the difference in near accidents between self-driving cars that used deep-learning model X vs. self-driving cars that used deep-learning model Y?" or "How many cars passed the toll bridge in the last hour?" or "How many malfunctions were reported by a turbine of a particular model in all deployments in the last year?" using clean and clearly specified SQL queries over all the data published in the network from many different data sources.

The network described herein can be treated as a platform to manage data that creates strong incentives for the members of the network: Publishers are incentivized to participate in the network as it offers a solution to manage their data without the need to build and manage and scale databases. Once a publisher sends data to the network, the data is available to query as the network provides the processes that are needed to satisfy SQL queries over the data, the processes to scale when data the volume increases, and as the network provides the needed availability, security and access control. Contractors that store and process data are incentivized as they can monetize their storage and CPU without investments in software infrastructure. Any machine that is configured with the contractor side software, can connect to the network as a contractor and offer resources, such as storage and CPU, in return for rewards. Data consumers are users and applications that issue queries and they are incentivized by being able to satisfy their queries at no cost or at a low cost.

Disclosed herein is a distributed network to manage the huge amounts of the IoT data without reliance on a centralized third party. Our approach distributes the data to independent contractors and is leveraging the blockchain as a metadata layer. This approach provides as much as needed resources to store and process the data and therefore is scalable and able to address the IoT data needs. Using this approach, the processes described herein offer a simple and repeatable method to add data and are able to unify the data to a consensus-based schema and overcome the challenges relating the massive amounts of the data. The outcome of the approach are processes running on independent edge nodes that when needed, are able to efficiently locate the relevant data and operate as a single database over the data. With this approach, the users experience would be very similar to the experience with a local database whereas the entire IoT data becomes available as if it is organized in local tables.

Disclosed herein is a decentralized, data publishing and querying system that leverages blockchain and unlimited number of independent nodes to publish and access the contents of IoT datasets stored across the participants. The methods described herein provide decentralized publishing and querying functionality over structured and semi-structured data. Said decentralized publishing functionality publish data by first connecting a publisher node with one or more contractor nodes and then transferring the data, in a peer to peer (p2P) process, from the publisher node to the one or more contractor nodes. The querying functionality connects a node that process the query, with the contractor nodes that maintain the relevant data. Then the query (or a derived query) is transferred to the connected contractors which process the query and return a result to the node that is processing the query. Said processing node aggregates the returned results to a unified result that satisfies the original query. When data is distributed to the contractors, the identifiers of the data and the distribution of the data are registered using a registry. When the query is processed, the information in the registry is queried, to determine how to efficiently process the query. If the registry is leveraging a blockchain, the node can maintain a local copy of the metadata such that queries to the metadata information are efficient. Using the metadata information, the nodes that store the data that satisfies the query are identified and the query process creates an on the fly a clustered database, whereas the nodes that make the database include the node that is processing the query and the contractor nodes that maintain the data which is needed to satisfy the query. This approach allows efficient processing of queries as for each query, the contractors that maintain the relevant data for the query participate in the query process and all or most contractors that do not maintain relevant data are ignored.

By using a blockchain, said blockchain enables a large number of parties who do not trust each other to reach consensus on the global state of the system and provides incentives and financial reward for performing tasks that are critical to the well-being of the system as a whole, including verification of data and query results, contribution, storing, and processing of data, and enforcing good behavior by the participants.

The above advantages can be realized by a method satisfying queries over data; said data was distributed to servers in a distributed network; when a query from a client server is received by a member of the network, the member is processing the query by identifying the data that needs to be evaluated to satisfy the query and deriving from the metadata the identifiers of the servers that store the identified data. The method further includes sending the query or a derived query to each of the identified servers, each identified server processes the received query and returns a result to the server of the member processing the query; said member aggregates the returned results to provide a unified result to the client server.

The above advantages can further be realized by a non-transitory computer-readable storage medium containing instructions for causing a processor to: receive a data request from a client; extract identifying information of requested data from the data request; obtain location information of the requested data indicating which of a plurality of distributed servers is storing the requested data by comparing the identifying information to a metadata information stored in the storage medium; and retrieve information from the identified servers such that the requested data can be provided to the client. The metadata storage can include a blockchain.

In some embodiments, the method further includes: obtaining the requested data from the distributed servers storing the requested data; organizing the requested data using the server; and sending the organized data from the server to the client. In some embodiments, the distributed ledger is a blockchain. In some embodiments, the distributed ledger is stored on the distributed servers and on the server. In some embodiments, the requested data is formatted as a plurality of log files stored on the distributed servers, and the distributed ledger stores information of transfers of the log files to the distributed servers. In some embodiments the ledger only identifies the location of the information of transfers of the log files to the distributed servers. For example, the ledger can show the group of servers that maintain the distribution of the data whereas the details of the distribution, per each time interval, is maintained on the servers in a local database. In some embodiments, the requested data is generated by an Internet of Things (IoT) device prior to being stored on the distributed servers. In some embodiments, the requested data is encrypted, and the method further includes sending a decryption key for the data from the server to permitted clients. In some embodiments, the requested data is divided among a plurality of the distributed servers, and the method further includes assembling the requested data before sending it to the client. In some embodiments, the method further includes, prior to sending the location information or the requested data from the server to the client: sending a request for the requested data to a server storing the requested data; and receiving the requested data from the server storing the requested data.

The above advantages can further be realized by a method of storing data over a network, including receiving data from a data publisher. The publisher may be using a heavy duty compute machine such as storage server with Intel CPU or a light weight compute machine such as a Cisco gateway with processing power to execute the publisher code. The method further includes sending a notification of receipt of the data from the storage server to other servers on the network. The method further includes receiving by members of the network, updates to the metadata and when appropriate updating a local copy of the metadata accordingly. The method further includes receiving, at the storage server, a request for the data from a member satisfying client requests. The method further includes sending the data or information derived from the data from the storage server to the member that satisfies the client requests.

In some embodiments, the method further includes: receiving a storage request from servers of publishers of data; evaluating storage availability on the storage server; and sending a storage offer to the data supplier reflecting the evaluated storage availability. In some embodiments the requests include SLA requirements such as availability and performance requirements. In some embodiments, the data is formatted as a plurality of log files stored on the storage servers, and the metadata stores information of transfers of the log files to the storage server. In some embodiments, the metadata stores information of the transfer of the data to the storage server, and transfers of other data to other storage servers on the network. In some embodiments, the data publisher is an Internet of Things (IoT) device. In some embodiments, the data publisher is a group of Internet of Things (IoT) devices that are sharing the same table to store the data. In some embodiments, the data is encrypted, and the method further includes, receiving a decryption key from the publisher In some embodiments members of the network are incentivized by payments using a token. In some embodiments members that store data are incentivized for providing storage and are incentivized per each query that they satisfy; in some embodiments; the incentive for storage is based on the size of data stored and the duration of the storage and the incentive for query is based on the number of rows being evaluated to satisfy the query.

In some embodiments members that provide storage and CPU publish their SLA and price in the registry and publishers approach the members that published the SLA and price that they require. In some embodiments, members that are interested to service the data dynamically bid on SLA and price.

BRIEF DESCRIPTION OF THE DRAWINGS

FIG. 4 is a self-describing event which is mapped to a table structure.

FIG. 5 is a table representing 2 self-describing events with a temperature reading being represented by a different name in each event, and the different names being unified to the same column.

FIG. 6 is a table representing information registered in a catalog when a log file is distributed from a producer node to a contractor node in the network of FIG. 1.

FIG. 8 is a table showing relations maintained in a metadata layer, which can be represented in a catalog.

DETAILED DESCRIPTION

Figure 1:
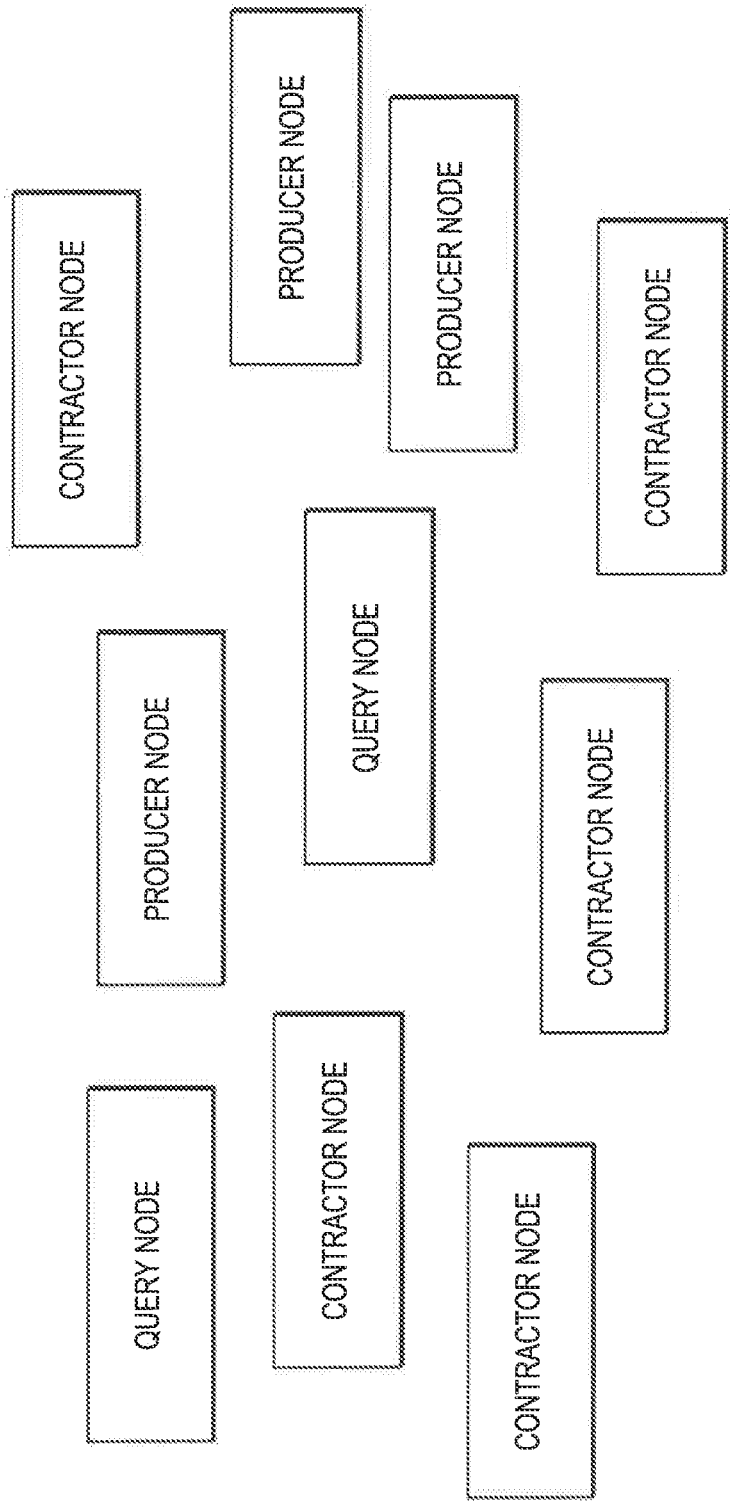
FIG. 1 is a block diagram of a distributed, decentralized network according to one embodiment with 3 types of members nodes—producers' nodes, contractors' nodes and query nodes.

Described herein is the storage and query of large volumes of data; in particular to the storage and query of log data. More specifically, embodiments herein consider log data as time series data which is stored on a network of machines next to or remote from where the data was generated. A metadata layer provides context to the data and queries are satisfied in a unified and cost-efficient way by creating an ad hoc, peer to peer (p2p) database to each query.

Embodiments describe a protocol and a software infrastructure that creates a distributed and decentralized network. Data being generated is distributed by members of the network to other members that store and process the data. The members that distribute the data are called publishers or producers, the members that store the data are called contractors or operators and the servers they used are called data nodes. Contractors are incentivized to join the network for rewards and publishers are incentivized to join the network as it provides a simple, efficient, scalable and unified way to manage the data. Publishers distribute the data to contractors that offer the needed SLA and remain agnostic to the management of the data. As the data is available through standard API, such as SQL, publishers can provide access to third parties in a simple way and be rewarded for providing the data. The network is very scalable as it is based on p2p processes without centralization. With more publishers joining the network, more rewards are offered such that more contractors are incentivized to join and smart contracts document and enforce the agreements that are made between peers of the network. Some members of the network process queries. These members are called coordinators and their nodes are called query nodes.

The protocol enables peers on the network to do the following: distribute data, secure data, determine where relevant data is stored, create logical entities, associate data with logical entities, negotiate contracts, transfer data, execute queries over the data, manage permissions to access the data, verify the integrity and availability of the data, pay nodes that provide storage and CPU resources to the network, and pay publishers of data for providing access to their data The log data is a self-describing time series data which is generated from variety of sources such as applications and smart meters. It can be of any size and it is managed through a decentralized approach where the data is distributed to different specialized miners (called contractors) that provide the storage and query support on their local machines.

In one embodiment, the software that is installed on a contractor includes:
1. Database software that is used for storing and querying the blocks of data assigned to that contractor
2. Encryption software that is used to implement query authentication and to store data at rest (when required by the SLA).
3. Communication software that manages the receipt of data from data publishers, the transfer of data between contractors, and communication with query nodes.
4. Monitoring software that measures the performance and availability of the host machine to ensure that it is complying with the SLA.

This approach allows contractors to compete with each other on the implementation of these components (e.g. using faster database software, better indexing, etc.).

To satisfy a query, a peer to peer database is created dynamically. The database exists only for the duration of a query, by connecting a query node with the relevant data nodes (the term data nodes and contractors' nodes and storage servers are used interchangeably). In the context of the invention, the nodes that participate in the ad hoc database are determined from the information maintained in the registry. Therefore, when data is distributed to members of the network, the registry is updated with the distribution information such that it is possible, for a given query, to determine which are the data nodes that maintain the data that satisfies the query.

To support the ad hoc database, in one embodiment, the process is leveraging the blockchain as a structure to provide the metadata information or to locate the metadata information. This metadata provides the needed information in a similar way to the metadata of a database system that describes the data being stored and important statistics about that the data that are leveraged during query planning and optimization as well as other information such as users and access control information.

For example, a query process determines the logical table to use from the query information and the data nodes that maintain the data from the metadata. Or, a query process determines if a user issuing the query has the necessary permissions and the permissions are determined by the metadata. The metadata provided by the blockchain may include the list of log files and contractors that manage each log file. The list of authorized users and their permissions, hash values which are fingerprints of the log files, and whatever additional information necessary to support the functionality of the ad hoc database.

The use of the blockchain allows complete decentralization. However, in a different implementation the metadata is managed by a centralized catalog that provides the metadata services. With a centralized catalog, the basic flow of a query is as follows: clients issue a SQL query which is sent to a coordinator server of that client (similar to how we choose our preferred search engine on the WWW today).

A coordinator parses the query, and queries a decentralized catalog or one or more centralized catalog servers to access metadata that is necessary for optimization and planning of the query, and for finding the contractors that contain relevant data. The query is then performed in parallel (using standard parallel query processing techniques) across all of the involved contractors. Optionally, contractors receive a payment in tokens from the coordinator in return for its effort during query processing. The coordinator then aggregates results and sends them to the client in return for a payment in tokens from the client.

The network motivates members of the network to allocate and provide storage and compute resources by issuing special coins that incentivize proportionally to the resources that each member provides to the network. As a result, it creates a self-managed ecosystem where data is organized in log files which are distributed over the network, and by the processes herein, this data is managed in a decentralized and cost-effective way.

We present a way to unify disparate and heterogeneous data and make the data available such that queries over the data can be satisfied. Said process is done by organizing the data as log files and distributing the data to contractors that store and manage the data such that the data can be efficiently queried on the contractor's nodes; and updating a catalog such that, given a query, the contractors that maintain the data needed for this query can be located. Therefore, queries over the data can be satisfied in the following manner: for each query, the contractors that store the data needed to satisfy the query are located, said contractors process a query that retrieves the needed data and a process unifies the retrieved data from all participating contractors. To facilitate this process nodes communicate as follows: to distribute the data, the node that maintains the log files delivers the data to the contractors that store and manage the data. To satisfy a query, the node that is processing the query delivers the query that each contractor needs to satisfy, to the relevant contractors and each contractor that executed the query returns the query result to the node that is processing the query. When all contractors replied, the node unifies the returned results to provide a unified result for the original query. This process allows to satisfy queries efficiently in a unified way. In addition, we replace the centralized approach with a decentralized, self-managed mechanism. The decentralization relates to the distribution and query of the data—these are done without a centralized authority as communications are between the independent nodes. The catalog may be managed in a centralized manner (for example, by maintaining the metadata in a centralized database) or in a decentralized manner (for example, by using a blockchain). With this approach, the data is distributed, and queries are satisfied transparently by processes on independent nodes and when needed, said nodes retrieve data from a catalog and communicate with each other such that queries are satisfied as if the data is organized in a single database.

For the data owners it represents a very significant cost savings and it removes the concerns relating to scaling—there is no need to bring the data to the cloud and ETL, storage is supported by distributing the data to contractor's machines that compete on the price and the service terms. To do that, embodiments herein contain software layers that manage the distribution of the data, the update of the catalog and the query mechanism over the distributed data.

The distributed data is maintained by contractors and in a particular implementation, contractors are rewarded for the resources they provide to the network and the reward is in the form of a coin managed by a blockchain. The same blockchain, or a different blockchain can be used to maintain the metadata that allows to treat the distributed data as a single logical database. The metadata is represented in the blockchain by updating the blockchain using colored coins (Bitcoin) or tokens and logs (Ethereum) or in any other way that the metadata can be derived from the blockchain. In Ethereum, logs were designed to be a form of storage that costs significantly less gas than contract storage. Logs cost 8 gas per byte, (whereas contract storage costs 20,000 gas per 32 bytes). For the data owners, this setup provides a very efficient and self-managed environment. In a different implementation, the metadata is stored in a centralized structure, for example a centralized database that is accessible to the members of the network. The management of the data is fully automated with the software layers and therefore, with these features, this approach offers a much lower cost than centralized solutions. For example, the approach of embodiments herein is based on peer-to-peer processes. Therefore, it scales to address any data volume. An alternative centralized solution, like a centralized database that is managing IoT data is complex to scale and therefore more expensive to use.

Embodiments herein use the concepts of accounts, coins and transactions to create a metadata layer. The metadata describes the data being managed, the distribution of the data, the users and their permissions, and when a query is processed, it provides the information that allows to bring together the resources needed to satisfy the query, it allows to validate permissions and to authenticate the data and result sets. Embodiments herein show a very efficient way to manage time series data. In particular there is no need to load the data to a centralized database. The time series data is organize in log files; said log files includes events represented in a self-describing format and these log files are distributed from the edge nodes to other members of the network that store the data. When network members process the data, during an update process or a query process, the nodes operate independently and there is no contention between members nodes that operate concurrently. Therefore, the proposed approach of the embodiments is very scalable, as more data is processed, additional nodes are assigned to process data. This is advantageous over an approach where the data is processed in a centralized database. In a centralized database, there is a limit on the compute resources that are available, in addition, the database needs to manage contention between conflicting processes, and therefore scalability is limited and more expensive. An example of contention would be if the global database is updating an index representing events by date, and there are multiple events relating the same date, therefore the same portions of a global index needs to be updated to represents the concurrent events and the database needs to manage the updates to the same section of the index. With methods according to the embodiments, multiple edge nodes maintain each a local index and the events, and therefore the updates, are distributed among the edge nodes and the likelihood of contention in the index is smaller.

Embodiments herein extend the usage of the blockchain, with the methods described, the blockchain can be treated as a metadata layer or the metadata is distributed in the network and the blockchain is able to identify the location of the metadata. The metadata layer is used by a DBMS (Database Management System) that is created dynamically for each query and remains only for the duration of the query. By one embodiment, the metadata is maintained in a blockchain and the metadata information is represented by a set of accounts and transactions. The accounts represent Logical Entities (Objects), and transactions are transfers of tokens between accounts. These transfers represent relations between the logical entities. By a second embodiment the metadata is maintained in a centralized catalog.

This embodiment maintains 2 types of coins—

Pcoins are used in a traditional way to pay for resources and services. These coins incentivize contractors to maintain the log files and/or process queries and in some scenarios, can be used to pay publishers for providing their data to third parties.

If the catalog is implemented as a blockchain, Rcoins are used to leverage the blockchain infrastructure as a metadata layer. Rcoins in many respects are similar to colored coins https://en.bitcoin.it/wiki/Colored_Coins. However, Rcoins have no value and are used as representatives of metadata facts that are maintained on the blockchain. The relation information of the metadata is represented by transferring Rcoins between accounts in the form of transactions.

On the Ethereum platform, both Pcoins and Rcoins can be represented using the ERC20 standard.

In the context of a blockchain, accounts represent state transitions and the state is created or updated as a result of interaction between accounts. Accounts are controlled by private key and are used to identify and group transactions. In this context, Logical Accounts represent logical entities and these are used to represent metadata objects. Examples of objects represented by the blockchain:

Producer Accounts (Publishers Accounts)—accounts representing log generators. For example, A smart meter generating data is represented by a producer account. A car generating data from different sensors is represented by a producer account.

Log Accounts—accounts representing log files.

Contractors Accounts—accounts representing contractors on the network. The contractors are managing the storage and query of the data.

Users Accounts—accounts representing users and data owners. User accounts maintain the profile/permissions for each user.

Tables Accounts—accounts representing tables.

Permission Accounts—accounts representing access control policies.

As demonstrated below, the transfer of a Rcoins represents relation between objects and objects and relations make a metadata layer.

A transfer of a Rcoin between a Log Account and a Contractor Account determines that the log file is stored with the specified contractor.

A transfer of a Rcoin between a Log Account and a Table Account determines that the log file is part of the data set of the table.

A transfer of a Rcoin between a User Account and a Table Account determines that the user is permissioned to query the table. This transaction may include additional information, such as a list of attribute names that limit the query of the user to the listed attributes.

A transfer of a Rcoin between a User Account and a Permission Account determines that the user is assigned with the access control policies represented in the account.

In one implementation, the association of log files to logical entities has a similar impact to the load of data in a table of a database. But as the process only requires transfer of coins, only the association is maintained, and the data is not touched.

With this setup, the following metadata queries can be satisfied:

Given a producer—It is possible to find the log files generated by the producer. These are traced by the transfers of coins from the producer account to the log files accounts or as a child accounts of the producers account.

Follow the coin transfer from the Log Accounts to find where the data is stored. This process outputs the list of contractors.

With this process, given a contractor—the list of files managed by the contractor is available.

In the same manner, given a table—the list of log files that contain the data of the table is available.

This setup can manage and trace the data and satisfy many types of queries. For example, a query to find the average speed of cars passing on a particular bridge in the last 2 months. Here are the processes that exemplify ho the query is satisfied:

1) A sensor on a bridge determines whenever a car is passing on a bridge.
2) The sensor or a process interacting with the sensor is configured to provide the data generated to a Producer Node.
3) The sensor organizes the data as a list of events. An event includes a time stamp and the speed of the car.
4) These events are organized as self-describing files such that it is possible to satisfy queries over the data using the information contained in the files.
5) The files generated by the sensor are read by a Produce Node.
6) The Producer Node is configured to maintain the metadata and therefore is able to process the data. For example, it can determine the logical table (herein Bridge table) that needs to contain the data.
7) The Producer Node is doing the following steps
   a. Every time a new file is generated by the device, it reads the file.
   b. It determines which is the Contractor Node that would store the file. In this example, this process is done by a bidding process—retrieving from the blockchain the list of contractors available to store and process data. Then interacting with these contractors by exchanging messages to determine which contractor can provide the best price for the needed SLA.
   c. It updates the blockchain to represent the selected Contractor Node to manage the file.
   d. It updates the blockchain to represent that the file data is associated to the Bridge Table.
   e. It transfers the file to the selected Contractor Node for storage.
   f. It creates a smart contract that would mange the payments to the contractor.
8) When the query is issued, the query is provided to a Coordinator node and processed by the Coordinator Node as follows:
   a. The node retrieves, from the blockchain, the list of log files assigned to the Bridge Table.
   b. It determines which of the log files are from the last 2 months.
   c. For each qualified log file, it determines the Contractor that maintains the file.
   d. It sends a request to the qualified Contractors to sum the speed and count the cars where the time stamp on the event is from the last 2 months.
   e. It sums the speed returned by all qualified contractors and divides the result by the sum of the counts (of cars) returned from all qualified contractors whereas the result is the average speed.

In a different implementation, the information in the blockchain only shows where the metadata is maintained. For example, the blockchain includes the following information:

List of logical tables, and for each table the list of contractors that service the data assigned to the table. If information relating the table is needed, it is maintained by the contractors that service the table and these contractors may use a local database to maintain the information. This approach minimizes the amount of data on the blockchain to the data which is needed to locate the metadata. The reason to minimize the metadata on the blockchain is that the cost of maintaining data on the blockchain is higher than the cost of maintain the data in a conventional database.

Using this or similar setups, the blockchain serves as the anchor to the metadata and the data. In such setups the network is able to offer a decentralized management of the data.

In the process exemplified above, a producer node receives data from one or more devices, the data is organized as self-describing log files, these files are distributed to contractor nodes in the network; the distribution of the files is represented in the blockchain or can be identified by the blockchain: the log files are associated with a logical table; given a query to a coordinator node the relevant contractors are identified; said coordinator node connects with the said contractors and request the information from which the said query can be satisfied.

The processes herein can be implemented as an extension to digital wallets that operates on the network. For example:

A producer wallet is a software layer that represents the producer as follows:

A process is triggered when a new log file is available. Said process contains a sub-process that identifies new generated data or it offers an API that is called from an application or a smart device to declare the availability of new data. If the new data is not organized as a log file in a self-describing format, it can make the format self-describing by calling a specific procedure that is capable to map the data to a self-describing format. It triggers the contract process to identify contractors that would service the data, by one implementation it initiates a bidding process that determines the said contractors; said process establishes a binding contract between the producer and the contractors; said process initiates additional sub-process to update the catalog accordingly. In a different implementation, contractors register on the blockchain with the SLA they offer and the details of the SLA are sufficient for the producers to determine which are the contractors to service their data.

In one embodiment, each log file is identified with a unique name. Prior to being shipped to a contractor, the log file may be encrypted such that only permitted processes may consider the content. Then, the content of the log file is hashed. The hashed value for the generated log file is recorded on the blockchain. It allows to validate, whenever needed, that the data is complete and was not changed.

Prior to being shipped to a contractor the file may be compressed such that the transfer of the data would require less compute resources.

If the bidding process is invoked on the producer side, it identifies the candidate contractors to store the file, it generates a request for bids to the qualified candidates and determines the winners. When the contract process is completed, it is registered in the catalog and the producer sends the log files to the relevant contractors according to the terms of the contract. Multiple contractors may be used to store the same data. It allows redundancy in case a contractor is not available and it allows to determine the accuracy of the data by sending the same query to multiple contractors.

The Producer wallet implements the following functionality:
1. Compresses the log file.
2. Encrypt the log file.
3. Identify contractors and manage a bidding process.
4. Deliver the log file to the winning contractor.
5. Updates the metadata on the catalog. In one embodiment, the catalog is a blockchain and the metadata is represented by accounts and transfer of Rcoins. In a different implementation, the blockchain maintains only portion of the metadata. In addition, it serves as an anchor to the metadata whereas details of the metadata are stored by the contractors that service the data.

The update of the catalog describes the log file and its relations such that the location of the file and the logical table to which the file belongs can be retrieved from the catalog.

The user wallet implements the Coordinator functionality and allows to satisfy queries over the data. The functionality includes the following processes:
1. Receive the source query from a user or application.
2. Query the catalog to determine:
   a. The log files that needs to be queried.
   b. The Contractors that maintain the relevant data.
3. Create a peer to peer connection between the Coordinator and the Contractors Nodes.
4. Send a query to the contractors such that the source query can be satisfied by considering the query results returned by the contractors;
5. Unify the returned data from the contractors.
6. Provide a unified result to the user or application.

The catalog herein represents the access permissions. Therefore, when a user issues a query, the nodes participating in the process of the query retrieve information from the catalog to determine if the user issuing the query is permitted to view the data. If the catalog does not provide sufficient permissions; the query is not satisfied.

Contractors allocate storage on their hard drive. Then they register their storage availability on a catalog such that data logs from different devices are sent to their machines. When files are distributed, the Producer node determines the contractors that receive the data and these can be determined in many ways. For example: Contractors are determined for every new log file. By a different example, Contractors are pre-determined for the particular device that generated the data. By a different example, Contractors are pre-determined for a particular logical table. A bidding process can be used to determine the contractors to manage the data and contractors are tested for lower price and optionally other terms. For example; the type of hardware to service the data; CPUs which will be available to service queries, some performance characteristics, an option for penalty if queries are rejected by the contractor, if data is invalid, if queries are returned with wrong results, if the Contractor is not responding and more. The producer evaluates the contract terms supported by each contractor to determine the winning contractor. In some cases, a producer may prefer a contractor that would offer to pay a penalty for not being available or returning erroneous query results over a contractor offering a lower price or better performance.

When the producer determines the winning contractors, a binding contract is issued. The contract may have different forms determining the price for storage, the price to satisfy a query, type of hardware supporting the data, penalties and any other requirements as needed.

The software layer at the contractor side supports the management of the data. It includes, storing the data, executing queries, transferring result sets to the query node. Contractors can use local databases to manage the log data received. By one embodiment the data in the log files are mapped to rows and loaded to a table in a relational database. In this setup, queries are satisfied on the contractor node by the database.

At the same time, older logs which their contracts have expired, are removed. For the storage and query, contractors may be rewarded with Pcoins. These are different than Rcoins as they represent real value and are provided to reward for their resources and work.

The processes herein overcome issues relating performance and scalability in managing data. As explained, data is updated and retrieved based on a peer to peer network, therefore it is possible, using the methods herein, to address any data volume. This is the result of being able to add as many nodes as needed. With independent nodes, there are few contentions between multiple processes and therefore scaling is simple. In addition, as the data is distributed to many nodes, and as explained herein, insert and query processes leverage massive parallelism which leads to both scaling and high performance. By distributing the data to independent contractor nodes, data is processed faster as data sets are partitioned, and each partition is processed independently and concurrently on different nodes. This process replaces the usage of a centralized database where data is managed in a centralized location without the flexibility to manage data independently. For example, if the database maintains an index, the index creates contention as multiple data updates needs to be represented by the index and these processes are usually executed on the same node, and if not, they need to be done with synchronization such that conflicting updates of the index are managed.

The system herein operates such that updates of the metadata do not impact the performance. This is with importance if the catalog that maintains the metadata is a blockchain as the updates to the blockchain are slow. To avoid dependency on the performance of the catalog, a node according to some embodiments is maintaining a local copy of the catalog in a local database. Therefore, when metadata is needed, it is retrieved from the local database and updates to the catalog are done such that there is sufficient time for the updates to be represented in the local databases of the nodes. For example, a bidding process selects a contractor to store the data of a particular producer for a period of 2 weeks. The blockchain is updated accordingly. 3 days before the expiration of the contract a new contract is executed between the producer and a different contractor. As the new contract was done before the expiration of the first contract, there was sufficient time for the updates to be distributed over the network and therefore for the local copies of the blockchain to be updated. Therefore, when the first contract expires, the metadata is available on the local databases to show the new contractor as the new provider of the storage of the data.

The result of the processes herein is that a user has a similar experience to a user using a local standard database (such as MySQL or Oracle). The user may see tables and metadata information, and leverage access control and encryption mechanisms. He can query data using SQL, very much like a user of a conventional database. However, the value is that there is no local data. The data is managed by the network nodes and is dynamically and transparently brought to the node from which the query was issued, as if the data is managed by the local database. Therefore, the experience would allow a user to query data from the entire network, the said network can contain huge amounts of data, and the processes herein would satisfy the query in very high performance whereas the user does not need to manage scaling and performance issues as these are managed by the network.

The present embodiments provide the platform and the software layers that facilitate the management of logged data. Each layer is responsible for a specific functionality and interacts with the other layers. The combination of the multiple layers creates a protocol and an infrastructure capable of managing huge amounts of data without the need to administer the data and with no points of failures.

In the context herein, data is maintained on local servers, potentially next to where the data was originated or on remote servers indifferentially with the goal to provide the needed SLA. Embodiments show how to manage a global metadata layer which is able to identify the relevant data for a given query. When the data is identified, the suggested processes connect the servers maintaining the relevant data with the server that issued the query such that an ad hoc database is formed to satisfy the query.

This approach offers a decentralized storage and query of log data. It leverages the blockchain with a native protocol token (called "Pcoin", whereas P stands for Pay), which miners earn by providing storage and query to clients. These miners are called contractors. This is in order to differentiate between the miners supporting the blockchain (such as the miners supporting Ethereum) and the miners (contractors) that support the log data storage and query. The platform provided herein is managing the data by a decentralized network. An example of decentralized network is provided in FIG. 1. FIG. 1 shows nodes that operate by connecting to a network such that the network allows the nodes to communicate to each other when needed. Communication is by sending messages and data between peers in the network and when a node joins the network, the node becomes a member of the network by being able to communicate with other member nodes. Member nodes can be one of 3 types: producer node, contractor node or query node, and the network allows the nodes to communicate in a peer-to-peer manner. An example of such network is the Internet that allows members to be identified by providing an IP and port and communicate by sending messages using the TCP protocol. The role and functionality of the members are determined by the software package that operates on the node. Each node determines independently when and to which node or nodes a connection is needed, and, using the network, the said connection is established whenever needed. Said connection allows to transfer and receive messages and data as needed. Examples of connections are demonstrated in FIG. 2 (for adding data) and in FIG. 3 (for querying data). These connections are done directly between the nodes of the network without intermediary and without centralized management.

As will be explained, data is distributed by producers to contractors by establishing a p2p connection, when needed, between the producer and the contractors that service the data and a query is based on enabling a p2p connection between the query node to the contractors that maintain the queried data. The information that is needed to determine the nodes to connect for data distribution and query is maintain in a catalog or derived using a catalog that is available to all the nodes in the network. The said catalog may be organized in many ways such as a centralized database or a blockchain. The advantage in using a blockchain is that companies and users participating in the network do not need to trust the owner of the catalog as the blockchain provides predicted behavior and can enforce agreements between independent members of the network. In addition, very much like a centralized database, it makes the data contained in the blockchain and the updates available to the members or, by a different embodiment the blockchain directs a process to where the needed metadata can be derived.

Data can be distributed on the network in many ways. One example is to distribute the data to pre-determined trusted contractors such that the data owner trusts the security protocols and the availability of the contractor that is servicing the data. A different example is by determining the distribution dynamically. For example, issuing a bidding process which requests offers from contractors that are interested to service the data and selecting the contractors based on price or some other service terms.

In a particular embodiment, nodes in the distributed network request offers to service the distributed data and to provide the needed SLA using a bidding process. Nodes in the network reply to the bidding process and the winning bidders receive data to be serviced. The service includes storage and processing of queries over the serviced data. When a query is issued, the data that needs to be considered and the nodes that service the data are identified and these nodes process a sub-query such that the result from all the sub-queries from the identified nodes satisfy the query. The query may be a SQL query and the metadata layer may be leveraging a blockchain. The nodes that service the data may be offering their resources to service the data for rewards and these rewards may be in the form of tokens.

The service requested in the bidding process is for storage and resources like CPU and RAM to satisfy queries over the data. These requirements are part of the SLA requested. Nodes are requested to provide a price for the needed service and the process distributing the data determines the winning bidders and distributes the data to the said bidders.

When data is distributed, the data owner can determine if the data needs to be replicated to multiple contractors and how many copies of the data to maintain. The replication allows to recover failures and to authenticate data. The method of distribution of the data and the level of service needed can be organized using a configuration file on the contractor node, such that the processes of distribution and the instructions of how to manage the data are automated.

These processes create a robust network. The robustness is achieved by replicating and dispersing content, while automatically detecting and repairing failures. Data owners can select replication parameters to protect against different threat models. If a node fads, the network remains available. The approach also provides security, as content is encrypted and a hash value representing the log files is stored in the catalog and is used to determine that a log file was not modified.

For example, a data owner may decide to replicate the data 5 times. Therefore, when a log file is generated, the bidding process would allocate 5 data nodes to maintain the logged data and the file would be placed in its entirety on each of the 5 nodes. With this setup, if a data node drops from the network, there are 4 other copies of the data on the network and a special process can be triggered to identify a replacement to the data node that failed such that at the end of the process there would be 5 copies of the log file on the network. Optionally, the bidding process select a contractor which is trusted and guaranties the availability of the data. An example of such contractor is a large cloud provide, that configures some of the cloud machines as contractors' nodes and when data is transferred to the contractor it is replicated using the contractor's replication processes.

Optionally, prior to the transfer to the data node, the log file was encrypted whereas the keys are maintained with the data owner. An encrypted file might be publicly available, but without a key of some sort, the encryption cannot be reversed, and the file content is meaningless as it is different than the unencrypted content.

In order to authenticate the data, when a file is generated, it is registered on the catalog. The registration includes a fingerprint of the file in the form of a hash value representative of the data. To authenticate a file, the hash value is recalculated and compared to the value on the catalog. If the catalog is a blockchain, the blockchain data is tamper proof and therefore a different generated hash value indicates that the data was changed.

Figure 2:
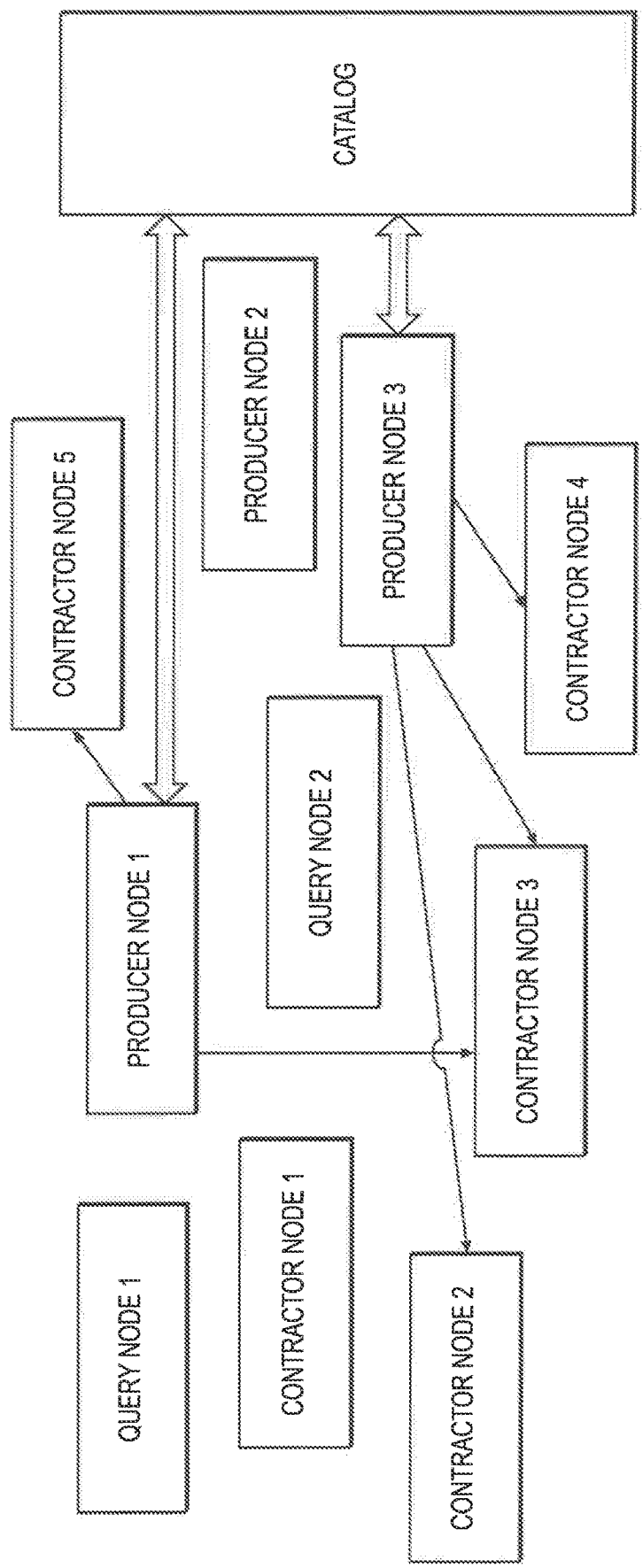
FIG. 2 is a block diagram showing the distribution of the data to contractor nodes in the network of FIG. 1.

FIG. 2 demonstrates the distribution of the data:
a) Contractors Nodes 1-5 register in the catalog their availability to store and process data. Each contractor specifies in the catalog the SLA he provides.
b) Producer node 1 receives a log file.
c) Producer node 1 reads the list of available contractors from the catalog.
d) Based on the SLA specified by each contractor, producer node 1 determines from the list of contractors on the catalog the sub list of contractors to consider.
e) Producer node 1 connects to the contractors on the sub list and request offers to service the log file.
f) Based on the offers of the contractors, producer node 1 determines that contractors 3 and 5 are the contractors to service the data.
g) Producer node 1 updates the catalog that the file is maintained by contractors 3 and 5.
h) Producer node 1 transfers the data to contractors 3 and 5.

In the same manner, producer 3 transfer the data to contractors 2, 3 and 4.

Figure 3:
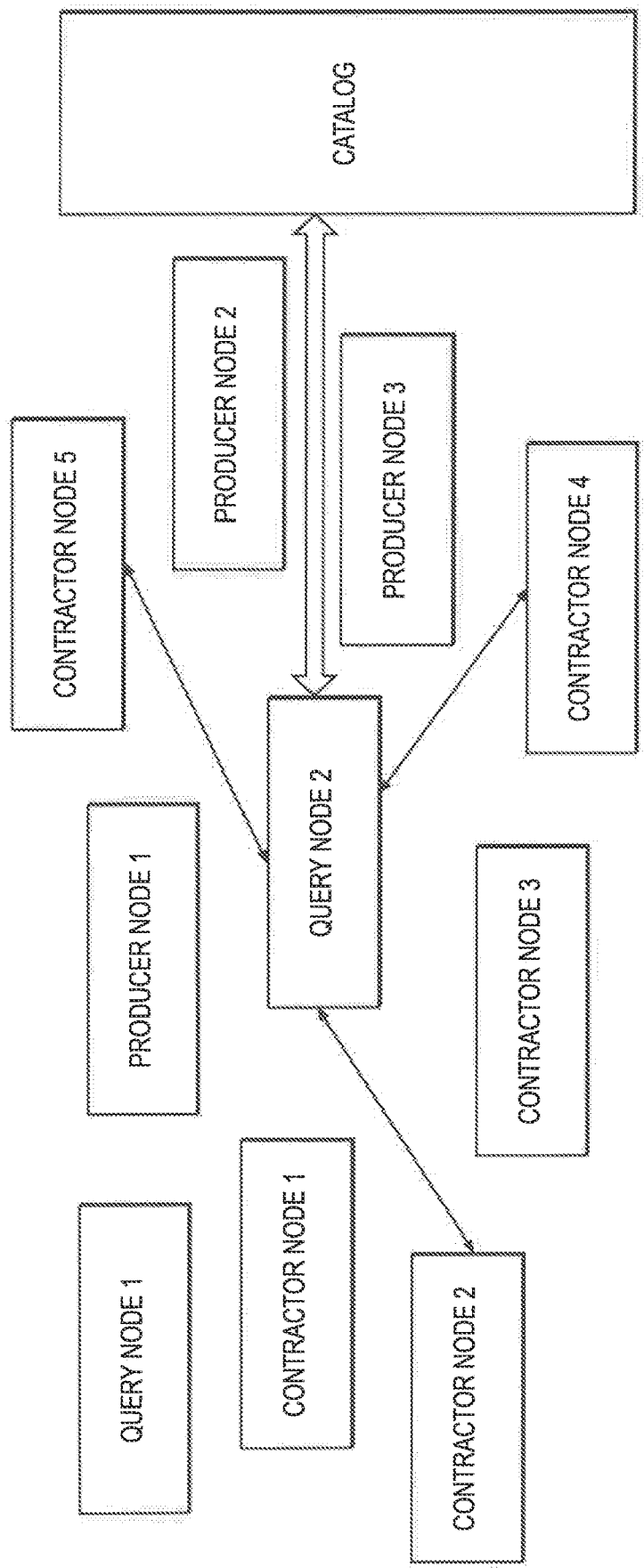
FIG. 3 is a block diagram of creation of an ad-hoc database to satisfy a query using the query node and the contractors' nodes that maintain the relevant data in the network of FIG. 1.

For a particular query, the query node acts as a coordinator and identifies and connects with the contractors that maintain the relevant data. When a connection is established, the query node sends to each contractor a query such that the information returned from all the participating contractors can be aggregated to satisfy the original query. The process on the contractors' nodes is such that each contractor receives a query and the query is executed independently on each of the contractor's nodes and the results are returned to the query node that aggregates the results to produce a unified reply. FIG. 3 exemplifies the process:
a) Query node 2 receives a query.
b) Query node 2 considers the query and the catalog to identify the relevant log files that are needed to satisfy the query.
c) Query node 2 considers the log files determined in step b and queries the catalog to identify the contractors that service the needed files. These are contractors 2, 4 and 5.
d) Query node 2 establishes connection with contractors 2, 4 and 5 and transfers a query to each contractor.
e) Contractors 2, 4, 5 executes the query on the relevant data.
f) Each contractor returns a result to the query node.
g) Query node 2 aggregates the returned results to form a unified result.

To be able to efficiently use the catalog in these processes, when the data is distributed, the catalog is updated by the producer to represent the information on each distributed log file and the contractor maintaining the file. Therefore, when a query is processed, the catalog provides the information on the log files that needs to be considered to satisfy the query and the contractor that maintains each log file. The said catalog contains the metadata information such that when a query is processed the metadata provides the list of log files to consider and where each file is stored.

The following is an example of how a query is executed. The example is requesting the average temperature readings generated from the smart meters during a time interval. The smart meters are identified by the names MeterA and MeterB and the query is processed by query node 2.

Using SQL like format, a query of that type may look as follows:
select avg(temp) from MeterA, MeterB where date>'2017-01-01' and date<'2017-02-01' and pressure>8.

To satisfy the query, the following process is executed:
a) Query node 2 receives a query. And the query provides the following information:
1. The time interval—greater than '2017-01-01' and less than '2017-02-01'.
2. The smart meters to consider—MeterA, MeterB.
3. The data needed—the average temperature.
4. Some other filtering criteria such as pressure >8.
b) Query node 2 considers the query and the catalog to identify the relevant log files that are needed to satisfy the query.
By one embodiment, the catalog maintains the list of files for each meter. The catalog farther contains, for each file, the time range of the events recorded in the file. Therefore, the list of files to consider is available from the catalog.
c) Query node 2 considers the log files determined in step b and queries the catalog to identify the contractors that service the needed files. These are contractors 2, 4 and 5.
d) Query node 2 establishes connection with contractors 2, 4 and 5 and transfers a query to each contractor.

e) Contractors 2, 4, 5 executes the query on the relevant data. In this step, each contractor executes the query over the log files that were provided by the query node. The way the query is executed on the contractor node depends on how the data is maintained by the contractor. A contractor may keep the data in log files and sequentially process the data or the data is maintained on a local database and the contractor satisfies the query using the database query interface.

With reference to the query example, as the log files are self-describing, the process can evaluate each entry in the log file, identify the date to determine that the date is within the range, identify the pressure to determine it is greater than 8, and every qualifying row would (1) increase a counter representing the number of qualifying events and (2) update a variable by adding the temperature of the qualifying event. The variable represents the sum of the temperature from the qualifying events. This exemplifies a derived query being processed by the identified contractors. The derived query to satisfy the average is:

select sum(temp), count(temp) from MeterA, MeterB where date>'2017-01-01' and date>'2017-02-01' and pressure>8.

f) Each contractor returns a result to the query node.

In this example, each node returns the counter and a sum: Contractor 2 returns a counter 5 (5 qualifying events in the log files) and the sum 10 (representing the sum of the temperature of the qualifying events). Contractor 4 returns 8 and 29 for the counter and sum respectively. Contractor 5 returns 7 and 11 for the counter and sum respectively.

g) Query node 2 aggregates the returned results to form a unified result.

The query node unifies the result by calculating the average over the entire qualified data set. To calculate the average, the total temperature is the sum of: 10+29+11=50 and the total qualifying events are 5+8+7=20. Therefore, the average temperature is 50/20=2.5.

The query process exemplified is based on the MapReduce programming model. It achieves high degree of parallelism as multiple nodes work concurrently (in the example, Data Nodes 2, 4 and 5), each of the concurrent nodes evaluate a subset of the data, and a hierarchical higher node (the Query Node in the example) integrates the inputs (of nodes 2, 4 and 5) to provide a unified and complete result.

The MapReduce process herein is unique as the data nodes to consider were determined on the fly, based on the information provided in the query together with information derived from the metadata in the catalog. In the example above, the names of the meters (MeterA and MeterB) together with the time interval (greater than '2017-01-01' and less than '2017-02-01') were sufficient to find the data nodes that need to process the query using lookups to the metadata. These could be data nodes that were never assigned to a cluster, but with the suggested process they form a cluster together with the query node just for the purpose of satisfying the query.

As demonstrated, a query is satisfied by first evaluating the query, then, using the information in the query, the information in a catalog is considered and the catalog identifies the nodes that maintain the data which needs to be considered. When the information is retrieved, the query can be satisfied.

In a particular embodiment, and as will be explained below, the metadata is maintained as information within the blockchain or information that can be located using the blockchain. By doing so, the metadata becomes available to all users. Then, a permission layer can be added to allow access based on authorization. If the metadata is encrypted, some users can consider the entire metadata and other users would consider only authorized parts of the metadata. With this approach, access to the data would be dependent on the level of authorization. This is based on the fact that without proper access to the metadata, the data nodes cannot be determined and or approached and or the encrypted data cannot be decrypted.

By one embodiment, the blockchain ledger is retrieved by a query node. Then, the ledger is processed and updates a local database on the query node. The update of the local database is such that it allows to find, for each query, the contractors that maintain the data that is needed to be considered in order to satisfy the query. An example of local database is MySQL. Using a local database, the distribution of the data and the characteristics of the distributed data are represented in the local database. For example, a log file representing Log data L1 generated from device X1, within time range T1 to T2, and whereas the device data is assigned to table TABLE1 and send for storage to contractor C1. In the process of distributing L1 by the producer node, the blockchain was updated to include the information represented in FIG. 6. As the ledger information is available to all participating nodes, the query node updates its local database with this information. With this information updated, when a query needs to evaluate data relating to device X or table TABLE1, within time interval overlapping the T1 to T2 interval, the query can identify the log file L1 and the contractor C1 maintaining the file. An example of query can be a SQL query such as: SELECT MAX(PRESSURE) FROM TABLE 1 WHERE DATE>T1 AND DATE<T3. Said query node evaluates the query to retrieve the information that is used for a lookup in the local database. Using the SQL example, the local database is queried to find the files and contractors for data assigned to TABLE1 in the time interval Q1 to Q3 and using this process, L1 is determined to be a log file to consider and C1 is retrieved as the contractor maintaining the L1 data. With this approach, when information from the metadata is needed, the local database is queried. When the blockchain is updated, the updates are available to the nodes in the network and added to a local database such that the local database represents an updated view of the metadata.

The approach presented above creates a DBMS on top of the suggested protocol which, as demonstrated, can have a SQL based interface. The DBMS is created by connecting the relevant nodes on the fly to satisfy a query. This process is coordinated by the query node that evaluates the information represented in a catalog based on the query criteria's, and by one example, available on a local database, to find and connect to the contractors that maintain the data that is needed to satisfy the query and said contractors return the data that is needed to satisfy the query.

In some embodiments, the metadata requires special permissions and authentications such that it can be considered only by permitted users and processes. For example, if the metadata is encrypted, only processes that maintain the relevant keys are able to consider the metadata. By one embodiment, the catalog is a centralized database and by another embodiment the catalog is a blockchain and by another example the catalog is maintained by members of the network that are located by information in the blockchain.

By one embodiment, the source data is a self-describing Time Series Data which is organized in log files. Time Series Data is commonly used by IoT devices, smart meters and many applications. By another embodiment, if the data is not self-describing, the process includes mapping of the generated data to a self-describing format.

Making device data self-describing is a process which gains momentum by many of the smart meters vendors. An example of self-describing data would be data appearing as attribute name-value pairs. The attribute name provides the description for the value that follows. The self-describing format provides the data model with the data itself. It allows to simplify, consolidate and automate the treatment of the generated data and facilitate the exchange of data between multiple Intelligent Electronic Devices (IEDs), and thereby to significantly simplify the process of creating IED monitoring applications. Most new devices today are designed to generate self-describing data and this trend would only increase in the coming years. An example is the approach where data model is generated automatically by mapping of IEC 61850-7-2 to the Hypertext Transfer Protocol (HTTP) using JavaScript Object Notation (JSON).

A self-describing log file represents a series of events. Events may include a timestamp and some additional self-describing information that is descriptive of the event.

Here is an example of an event generated from a device in a JSON format:

```
{
    "time": "2017-01-26T20:47:53.0000000",
    "dspl": " MeterA",
    "temp": 123,
    "hmdt": 34
}
```

This event can be placed in a log file that includes many additional events. As seen from the example, the data is self-describing as each event appears as a list of attribute value pairs. Using this data format, a process on a Data Node that needs to satisfy a query, can read the log file and analyze each log file to find the qualifying events. When the qualifying events are found, the process can act as requested by the query. For example, it can find a MAX value, or a MIN value, or Average, or SUM a value or return the qualifying rows, or return a list of UNIQUE values, etc.

A query such as—select avg(temp) from MeterA, MeterB where date>'2017-01-01' and date<'2017-02-01' and hmdt>8—will read the events in the file and analyze the event against the query condition. In this example, since the timestamp on the event is "2017-01-26" is within the time range specified by the query, and since the humidity measured (34) is greater than 8, the event qualifies to the query condition and as explained above, the information needed to calculate the average will be passed from the data node to the query node.

One of the challenges with self-describing data is to be able to unify different attribute names that represent the same attribute. For example, the JSON file created by a sensor from a different manufacturer may show the events as follows:

```
{
    "time": "2017-01-26T20:47:54.0000000",
    "dspl": " MeterB",
    "temperature": 82,
    "hmdt": 30
}
```

With this format, the "temperature" name in the JSON file may not be considered properly as the query is looking for the attribute name "temp". This problem can be resolved in many ways. For example, by creating a dictionary that would show that "temp" and "temperature" should be treated as identical. Or in other ways such as explained below. However, any one of these methods can be sufficient if terms with the same meaning would be treated in the same manner. In the examples above, the temperature measured using Meter A shows as "temp" whereas the temperature measured using Meter B shows as "temperature". A data structure can unify these terms such that a query would process the temperature correctly independently of the term used in the JSON file.

By one approach, the data is considered as if it is organized in tables by logically assigning the data from particular devices to a logical table and physically representing this assignment in the catalog. The columns in the table would be the list of attribute names that are in the log file. Or a user create a table and define the mapping of attributes to columns. When an event is considered by a process, the event's information is dynamically mapped to the table's data structure and if an attribute is missing on a particular event, the attribute is considered to have the value NULL.

Using the JSON examples above, if the log files of meter A and the log files of meter B are assigned to a meter's table, when the JSON file of Meter A is considered, the table is constructed dynamically to have the following columns:

Column 1: Time, Column 2: Dspl, Column 3: Temp, Column 4: Hmdt.

FIG. 4 represents the structure and content of the table representing an event generated from meter A.

When the log file of meter B is considered, the same columns are derived, with the exception of an attribute name 'temperature' rather than 'temp'. A dictionary, or any other method can link both to the same column. FIG. 5 represents the structure and content of the table representing events from multiple meters which are assigned to the same table. In the drawing of FIG. 5, Column 3 has 2 identifying names—"Temp" and "Temperature", and the column considers both names as identifiers of the same column.

A query using this method is able to consider the data as if it is organized in structured tables whereas the columns in the table are the attribute names derived from the events in the log files. By adding a process that integrates different attribute names that have the same semantic meaning, data from different sources can be unified to a shared query structure and a query can be satisfied even if the attribute names (describing the same semantic information) are different. In the example above, a query that needs to consider the temperature would consider both values (123 and 82).

With this approach, a log file can be mapped to multiple tables of the database by creating a logical association between the table to the log file. This is advantageous over the standard DBMS where a file is assigned to a table by loading the data to the table using a centralized database. The process of loading data from a file into a database system is similar to a process of executing INSERT statements to add the events in the log file to the data maintained by the database. This process duplicates the data that is in the file and outside the database, to a structure managed by the database and corresponds to the table structure.

For example, with a standard DBMS, in order to assign the data into 2 tables the data is loaded twice, once for each table, and physically stored twice. With the approach herein, the same file can be assigned to multiple tables, but the data in not duplicated as the query operates on the source log file by creating an ad hoc p2p database as explained above.

In the events examples above, the log files of Meter A and Meter B can be assigned to a table called "temperature readings" such that the files that includes the JSON events would be considered when a query evaluates all the readings regardless of the location of the meters, whereas, at the same time, the log file of Meter A can be also assigned to a table called "Palo Alto Readings" and the log file of Meter B can be assigned to a table called "Redwood City Readings" such that a query on the Redwood City data will not consider the Palo Alto data. However, regardless of the number of assignments, the data is not duplicated.

With this method, the metadata assigns files to tables. The assignment is only logical as it has no impact on the source data (i.e. the log file).

In a different implementation, contractors that service data use a local database to manage the data they service. The log files received from the publishers are added, by each contractor, to a table maintained by the local database. As the data of a table is managed by multiple contractors, the load is done by the independent contractors concurrently, and such that each contractor is processing a subset of the data. This approach is more efficient and scalable than processing the data in a centralized database as it scales by distributing the load to many contractors and it offers high degree of parallelism. When contractors are needed, they are incentivized to join as publishers offer rewards to the contractors that service the data.

Using the approach explained above, a query node identifies from the metadata the log files that needs to be considered for each query, and the contractors that maintain the said log files. The query node requests from each of the said contractors to process the relevant log files and satisfy a sub-query such that the query can be satisfied. Said contractors process each a sub-query over the said log files such that, based on the results of the sub-queries returned by each contractor, the query can be satisfied. Said log files are maintained in their self-describing format and the contractors dynamically map the log files to a table structure and process the sub-query on the dynamically mapped table. Or, log files that are assigned to a contractor are maintained by a local database on the contractor node and the sub-query is processed by the local database. The result of the sub-query from each contractor is returned to the query node.

The sub-query is a new query issued by the query node such that all the returned results can determine the result of the query.

With this method, the ad hoc database can be treated as a Relational DBMS, by one embodiment, when data is assigned to a table, the assignment does not need to process the data (i.e. INSERT operations are not required). Only the metadata is updated such that when the table is considered, the log file assigned to the table can be identified.

As the events maintained in a log file are self-describing, it is possible to map the device data to a table structure where the columns in the table are generated dynamically based on the metadata part in each event and the data part are the values recorded in each event. Or, a dictionary can map the self-describing data to a pre-defined table structure.

This process can be done dynamically when events in a log file are considered, or when events in the log file are loaded to a table maintained by a database, and it can be optimized by mapping the metadata part to predefined column names. This would allow to unify column naming when different types of devices are assigned to the same table and different attribute names describe the same table column.

With this approach, events are considered the same way rows in a relational database are considered and therefore SQL based queries on the events can be satisfied.

In a different implementation, each contractor maintains a local database; the log files are loaded to the database. By one example, each event is mapped to a row and inserted to the database. The structure of the table in the local database is based on the attribute names in the self-describing files, and the metadata can include the mapping of different attributes to the same column. The sub-query is a SQL query that is processed by the contractor on the local database. Examples of mapped tables are in FIGS. 4 and 5. Examples of local databases are MySQL and Oracle.

The data types are also represented in the metadata such that, when needed, the strings are mapped to the needed type. For example, JSON format represent the data as strings. The metadata can represent an attribute in a different type and processes using the attribute's data transform the string to the needed type. For example, the temperature readings in the source log file is represented as string and the metadata represents the data type as float, when needed the string is mapped to a float value.

On the Ethereum Blockchain, the assignment of a device to one or more tables is represented on the blockchain using tokens. Tokens in the Ethereum ecosystem can represent logical entities and relations. Some examples are: coins, loyalty points, gold certificates etc.

By one embodiment, accounts and coin transactions are used to represent the needed metadata layer on the blockchain. With this approach, logical entities are represented by accounts and a special type of coin (called Rcoin) is created to represent relations. Each account is represented by an address and relations are represented by transactions. A transaction is generated by sending Rcoin from one address to another.

In a particular example, the account #8 represents Meter A, the account #1001 represents Table Temperature Readings, and the accounts #5002 and #5003 represent each a Log File of Meter A. The account #6002 and #6008 represent Data Nodes (contractors' nodes).

Sending Rcoin from the account #8 to the account #1001 represents that the data generated from Meter A is assigned to Temperature Reading Table. Sending Rcoins from the account #8 to accounts #5002 and #5003 represent the files generated from Meter A. Sending Rcoins from #5002 to account #6002 represents the data node that stores the first log file and sending Rcoin from account #5003 to account #6008 represents the data nodes that stores the second log file. This approach represents objects by accounts and transitions show relations. This approach makes the blockchain a representative of a metadata of a database and it is using the internal data structures and interfaces offered by the blockchain. With this approach, a query can use the information to determine the members of the ad hoc database, create a p2p connection between the members and include the list of files to consider when the query is processed on each data node.

This approach makes the blockchain a representative of a metadata layer of a database, the database is formed whenever a query is processed and the nodes that form the database are determined using the metadata by the node that process the query.

These transactions may include additional information. For example, when an account representing a log file is distributed from a producer node to a contractor node, the information in the transaction includes the information shown in FIG. 6.

By a different example, tables and contractor are represented by a unique account on the blockchain. Contractors are selected to service each table, and the relation between tables and contractors is represented by a transfer of coin between each table and the contractors that service the table's data. The information on the blockchain per each contractor includes the IP and port that identify the contractor and details of the metadata relating each table are available with the contractors that maintain the table's data. If the details are needed, the contractors are located from the information on the blockchain and the details are retrieved from the contractors. The contractors can maintain the details of the metadata on a local database. These details can be the list of columns and data types, the list of devices that contribute data to the table, the distribution of the log files to the contractors nodes and other statistic information which can be used to optimize the query processing.

For the purpose of this disclosure, any method that would identify the metadata, the members of the ad hoc database and the data to consider can be used.

With the method herein, it is possible to process a query as follows:
1. Determine from the query parameters the name of the table that needs to be considered.
2. Use the table name to query the metadata and retrieve the list of the devices that generate the data.
3. For each device, query the metadata to identify the relevant log files.
4. For each log file, query the metadata to identify the data nodes that maintain the file.
5. Connect the query node to the data nodes to form a database that satisfies the query.

In a different example, the metadata represents the list of log files associated with each table, and steps 2 and 3 are unified to retrieve the list of log files associated with the table.

If the query includes additional parameters, and said parameters are included in the metadata, the log files to consider are filtered to process the log files satisfying the filter criteria. For example, a query is interested with data within a date interval, and the date intervals of the log files are represented in the metadata, only the log files that satisfy the interval are considered. In one embodiment, each of the log files is uniquely identified by a unique name. The name of the file is representative of the device or process generating the file and the date range of the events contained in the log files.

The log files are stored on any number of contractors' nodes such that:
a. A log file may be split to multiple sub-files and each sub-file is distributed to a different contractor.
b. The content of the log files may be encrypted.
c. The log file may be compressed.

The physical setup is not a representative of the logical setup. The goal of the physical setup is to distribute the data over multiple contractors. This setup keeps the data next to the edges on multiple physical machines to eliminate the complexity and costs associated with a centralized database. In particular, this setup provides performance and scaling as a query is serviced by multiple servers that process the data concurrently providing a high degree of parallelism.

Embodiments facilitate the determination of the degree of the availability of the data. When a log file is distributed, it may be distributed to multiple contractors such that multiple copies of the same log file are maintained by different nodes in the network. The list of contractors for each log file is represented in the metadata and if a contractor fails, a process of the embodiment that needs the data can approach a different contractor that maintains a copy of the needed data. Amazon on his cloud offerings can go up to 6 copies of the data (managed by a centralized database). The process herein offers a similar flexibility with no limit on the number of copies to maintain.

By one embodiment, logical entities are represented by accounts on the blockchain. In a particular embodiment, tables and users are each represented by an account. The owner of the table is a user that can provide access permission to the data in the table and a permission is represented by a transaction that transfers Rcoin from the table account to a user account. This transfer represents permission and as the user owning the table is owning the key to the table's account, the said user controls who are the permitted users to access to the table's data. With these transactions, a process can determine permissions and reject a query when a table being considered is not associated with the user issuing the query.

By a different example, queries are represented by accounts and permissions are transactions represented by transfers of Rcoins from the owner of the query account to the accounts of the permitted users.

The Transfer of coin from a query to a user indicates a permission provided to the user to execute the query. Representing queries by accounts creates a shared pool of predefined queries that can be called and used by various participants of the network.

In this context, the metadata is a data structure that provides the information on the data to facilitate the processes herein including the distribution of the data and the query processes. In one example, the metadata includes the mapping of logical tables to files such that when a query is processed, the metadata provides the list of files to consider and the location of each of the said files. In addition, the metadata may include permissions to users such that processes herein can reject queries from unauthorized users. The metadata herein is similar to the metadata maintained by a conventional database to represent tables, columns, data types, users, permissions and any other meta information that is required to facilitate the processes herein.

If the metadata is maintained by a blockchain, the metadata may be represented by Accounts and Transactions on the blockchain and the meta information becomes available to a query process as the blockchain data is available to all.

Therefore, for a given query, the list of servers and the required files on each server are available. With this information a peer-to-peer (P2P) connection is established between the server issuing the query (query node) and the servers containing the data (data nodes). The query is send to each data node with the list of the local log files to consider. These nodes evaluate the query on their local log files or using a local database that allows to satisfy queries over the data, and each node returns a result set to the query node. The query node only needs to aggregate the result sets to provide a unified result to the process that issued the query.

The processes of embodiments may include the following:
1. Data is created at the edges of a network from different sources.
2. The data from each source is organized as one or more log files.
3. Each log file is identified by a unique name.
4. Each log file includes data generated within a time interval. The time interval can be represented in the unique name.
5. The data in the file is self-describing. It includes a list of events whereas each event includes meta-data representative of the event. The data may include a time stamp representing the event.
6. If the data is not self-describing, a special process transforms the data to be self-describing.
7. Each log file may be compressed.
8. Each log file may be encrypted.
9. The log file may be broken to multiple files. Each of these files is identified by a unique name.
10. A special process identifies the Data Nodes to store the log files.
11. In one embodiment, a special process creates a bidding process where participants in the process offer storage and CPU to store and maintain the log files. This may be done in exchange for rewards. When the bidding process is completed, Data Nodes for the log files are available.
12. A special process updates a meta data layer with the information that is needed to identify the Data Nodes which contain the log files that are required to satisfy queries.
13. The metadata may be stored in a blockchain or the blockchain may include the information to identify where the metadata is stored.
14. A special process transfers the log files to the identified Data Nodes.
15. Given a query, the metadata provides the information to locate the Data Nodes and the log files on each node that are needed to be processed in order to evaluate the query.
16. Given a query and the Data Nodes that store the relevant log files, the query or a sub-query is transferred from the Query Node to the relevant Data Nodes.
17. The information provided to each of the Data Nodes can include the list of files to consider.
18. Each of the Data Nodes process the sub-query over the relevant log files and returns the result to the Query Node.
19. If the Data Nodes represent the log files using a local database, the list of log files to consider may not be needed as the sub-query is processed using the local database.
20. The Query Node unifies all the results from all the Data Nodes to provide a unified result.

The network herein supports three types of members:
1. Members that produce data (called publishers or data owners or data producers).
2. Members that store data and satisfy queries over the data (called contractors or data nodes).
3. Members that query the data (called query nodes or data consumers or coordinators).

These members are represented as nodes in the network such that:

A producer node is the node managing the newly generated data.

A contractor node manages the storage of the data and satisfies queries over the stored data.

A query node receives a query from a user or an application and is responsible to satisfy the query. This node acts as a coordinator—given a query, the node would first identify the contractors that maintain the data that needs to be considered, and second, it would form a p2p connection with these contractors. The members being connected, form, on the fly, a clustered database. As detailed in this document, the database created can efficiently satisfy the query and once satisfied, the database dissolves. The query node acts in a similar way to the optimizer of a database as it performs query planning and optimization, along with coordinating query execution and managing the return of query results to the user.

The processes of embodiments include the following:
1. Producer node processes—managing new data
    a. A process of adding new log file. It is based on organizing events in a self-describing format and placing the events in a file. The file is identified by a unique name and it maintains a list of events which relate to a time range.
    b. A process to identify the contractors to store and service the file. By one embodiment, the process sends information about the file to store. The information includes the needed storage duration, the file size and additional information that is needed for the bidding. The process evaluates the bidding offers to determine the bidders to service the data. The bidding terms are represented in a smart contract that is stored on the blockchain. The distribution of the data is represented in the blockchain. Or, a process that evaluates the information in a registry to identify contractors from the SLA they offer which they registered in the registry, such registry can be a blockchain,
    c. A process to transfer the log files to the contractors selected to service the data.
2. Contractor node processes—servicing the data
    a. A process to register contractors and the SLA they offer in a registry.
    b. If bidding is used, a process to reply to a bidding offer. The process evaluates the SLA requested, the service duration, storage and query requirements as well as other requirements and replies with cost and additional information provided to the producer.
    c. A process to receive and store log files. The files transferred are stored on the contractor's data node and are available to a query. The files can be loaded to a local database on the contractor node.
    d. A process to satisfy queries provided by a query node. A query on the contractor node evaluates the relevant log files, if the list of log files is provided, or if the data is stored on a local database, the local database satisfies the query. The result is returned to the query node.
    e. In a particular embodiment, the contractor determines, using the metadata, if the user issuing the query maintains the permission to process the query.
3. A query node processes—Processes on the node coordinating the processing of a query
    a. A process to determine from the metadata, based on the information included in the query, the contractor nodes that maintain the data that is needed to satisfy the query.

b. Create an ad hoc database, the nodes that make the database are the query node and the contractor nodes that maintain the data.
c. A Process to determine a sub-query that needs to be satisfied by each of the said contractors such that the query can be satisfied by considering the returned results of the sub-query by the said contractors.
d. A process that sends the sub-query to each contractor and receives the replies.
e. A process to assemble a unified result based on the said replies.

By one embodiment the query node provides a SQL API to the out of network processes. When a query arrives, the node acts in a similar way to the parser and optimizer of a database.

The parser provides the following outputs:
i. A structure containing the table names and the information used to filter the log files. For example, the time intervals, device names, locations etc. This data is added to the relations represented by a catalog and can be retrieved and used as a filter criterion (or as an index) when the catalog data is searched.
ii. A sub-query that would be processed on the to be connected contractors' nodes and would distribute the computation among the different contractors and the query node. For example, a query to calculate average would be transformed to a query that provides the sum and count of the qualifying rows. The transformed query would be processed by the relevant contractors, in parallel (whereas each contractor evaluates the data on their local database) and unifications of the results would be done on the query node.

The optimizer would use structure (i) to query the catalog to determine the files maintaining the relevant data and for each relevant file the contractor to use. Then, a connector process would form the p2p connection that creates the ad-hoc database and the new query described in (ii) is transferred to the connected contractors. When the query results are returned they are unified by a receive process and the unified result is returned through the SQL interface to the caller. Using the average query example, the process would aggregate the totals and the counts from which the average value that satisfies the query is derived.

These processes interact with a metadata layer organized in a catalog. By one embodiment, the blockchain layer is used as a metadata layer or the blockchain is the anchor to the metadata. One of the properties of a blockchain is that it is accessible to all users and members of the network. Other properties that make the blockchain a choice for the metadata is that it provides the trust, reliability and availability to the metadata.

The metadata information may provide the following:
1. The list of contractors that are available to store and process data.
2. For a given log file, it provides the location where the file is stored.
3. For a given log file, it lists the logical tables to whom the file belongs.
4. For a given table, the list of log files that contain data that is assigned to the table.
5. For a given log file, the hash of the file or the hashes representing sections of the files. The hash can determine if a file was modified as rehashing the content of the file should yield the same result.
6. The list of authorized users and their permissions to view data.
7. A list of predefined queries These nodes form a distributed network of nodes, with different types of node members. The network allows to store data and to satisfy queries. A query is satisfied by dynamically connecting a query node with the relevant data nodes. Each of the data nodes maintain a portion of the data and the query is processed concurrently on all the data nodes. Each of the data node returns the result to the query node that aggregates the data to a unified result.

The process of applying a query to multiple nodes that concurrently process the data as an input to a node that aggregates the result to form a unified result is called MapReduce. The present disclosure implements this model on log files that are distributed in the network and therefore are maintained in a decentralized way.

In one embodiment, the process distributing the log files is based on a bidding process between producers and contractors. The process includes a producer query to a metadata that provides a list of contractors available to service data and establishes a P2P connection between the producer and the said contractors. These contractors are presented with the requirements—the producer describes the needed service, for example, the data size, storage duration, and the query requirements in a message send to the potential contractors that bid on the terms to satisfy the requirements. The producer identifies the winning bidders and contracts with the winning bidders. The contractor updates the meta data such that for a given file, the location of the file is available. This process is automated, and the contract can be enforced using a smart contract.

This approach provides a decentralized processing and storage platform that supports a decentralized protocol. In the context herein, the protocol defines the processes and interfaces that allow distribution of the data and satisfaction of queries over the data.

The network provides strong incentives for the members. For the producers, it offers an existing platform to manage theft data at low cost. In addition, the platform provides a SQL interface to the data and the access control mechanisms maintain their ownership of their data. Therefore, producers can leverage the network to monetize their data by providing access to third parties for rewards. Contractors leverage the network to monetize their resources for rewards as they are rewarded for providing storage or satisfying queries or both. And data consumers are rewarded as they can issue SQL queries against the entire wealth of data produced by IoT devices.

Embodiments describe a platform of a distributed data management processing that can leverage the blockchain technology and cryptography to secure the data and to incentivize contractors by compensation that is proportional to the resources they provide.

Embodiments further unify the data generated from the different sources such that it is possible to build applications and processing logic that integrates the data of the different devices. As an example, it becomes easy to unify IOT events streams to a common time series log structure which is distributed to storage and can be efficiently queried—such that one can write an application or a trigger—for example, when temp from sensor A is greater than 5 and pressure from sensor B is greater than 10, → do x; and thus, making the sensors able to communicate with each other.

The approach herein provides a cost-effective method to manage high volumes of Time Series Data. The centralized, cloud-based approach requires to move the data to the cloud. This approach is not economical or feasible as the amount of data is huge. The approach herein is also different than an approach that creates small data centers at the edges of the network. With that approach, companies would find that they need to manage many small data centers rather than a single data center in the cloud. With the approach herein, there is no centralized database and there are no small data centers at the edges. The data remains in its native, self-describing format at the edges and processed only for a given query. Or, the data is organized in local databases on the contractor's nodes whereas the level of contention when these databases are updated is much lower than using a centralized approach that manage enormous amounts of data. From the data owner perspective, the data is treated in a unified way regardless of which is the contractor that hosts the data and the physical location of the contractor's node. This approach can satisfy queries in next to real time, in a much more efficient way than if the data needs to be loaded to a database on the cloud or at the edges. The split of the huge amounts of data to many log files that can be processed independently and concurrently provide high degree of parallelism.

Leveraging a public network, such as Ethereum, and creating a bidding process for the storage and query, the storage and compute are based on rentals of available machines instead of paying for a purpose-bunt data center or cloud infrastructure. It is a very efficient way to manage data because multiple machines are supporting the query processes and provide high degree of parallelism. At the same time, there is no need to load the data to a database and as a result the data is not duplicated. At the same time, the same physical data can be considered by multiple logical entities (similar to views in a relational database). And the data is more secure because there is no central authority that manages the data and as files can be encrypted and distributed. To get all these advantages, there is no need to establish a centralized management or transfer the data to the cloud or manage many and diverse data centers at the edges of the network.

To protect the data, files are encrypted client-side next to the device before they are uploaded on the contractors nodes. For higher security, log files can be further split up into chunks which are first encrypted and then distributed for storage and query across the network. The network is comprised of nodes run by contractors around the world who rent out their unused CPU and hard drive space in return for incentives.

The decentralized aspect means there are no central servers to be compromised, and with client-side encryption, the data owners are in control of the keys to the files.

Log files represent a huge amount of data generated from different sources. Examples include log files with information generated by monitoring the infrastructure components of a large network with variety of managed resources and component. IOT devices generate enormous amounts of data which is expected to continue and grow to unprecedented scales. Bringing all that data to a centralized database is not efficient. The time and efforts needed to bring together and ETL massive amounts of data would counter the value of the data. In addition, these processes over these amounts of data are too expensive to tolerate.

These log files contain valuable information that needs to be queried and in many cases in next to real time. For example, if a network component fails, or the monitoring detects conditions for a potential failure, an alert or a trigger message is required to activate the fallback process. In addition, different log files need to be synchronized such that events of different sources can be considered in a unified way. For example, if temperature reading from device A in the last hour is X and the pressure during the last hour from device B is Y, process Z needs to be activated. These requirements are usually addressed by specific code organized around the specific components. These types of solutions are very expensive to develop and tune and are not scalable for environments with magnitude of log generators. With the methods herein, there is no need to write specific code as the query method can determine the condition by querying the relevant log files.

Users that issue queries may be restricted by permissions. The permission grant rights to view data and by one embodiment, a data owner grants the rights to the users that issue queries. The permissions may be represented in the blockchain in many ways. By one embodiment the user permissions are represented by Rcoins transferred from the account representing a table to the account representing the user. The transfer is represented on the blockchain and as such makes part of the metadata.

For example, a data owner owns an account representing temperature readings in Palo Alto. If the data owner does not transfer Rcoin from the table account to the account of a particular user, then a query issued by the user to view the temperature reading in Palo Alto would be rejected. To do that, the Query Node would request the user account number. The account number would be transferred to the data nodes with the query parameters. The process in the data nodes would validate the transfer of coins from the Palo Alto table account to the user account before executing the query. If the required transactions are not found, the query would be rejected.

In a different example, the Rcoin transaction includes some additional information that restricts the permission as it lists the attribute names that can be queried by the user. When a user issues the query, the data nodes would only satisfy the query if the non-permitted attributes are not being queried.

On a public network, some nodes may be dishonest. If these nodes are enrolled as Contractors Nodes, then data can be corrupted, or queries can be satisfied by these nodes with false returned data. To identify malicious nodes or ignore queries returning erroneous data, a process that validates queries can be applied. This process leverages the fact that data is duplicated on multiple nodes and it operates by executing a query multiple times comparing the result sets of the execution. If executions do not return identical results, one of the nodes is malicious, or maintains erroneous data and should be removed from the network. To identify the node to ignore, the process can use majority of identical executions to invalidate nodes showing divergence in the executions. For example, if a query is issued twice, each time with a different set of nodes, and the first execution returns the value 5 and the second returns the value 6, a third execution that returns the value 6 (by different contractors that maintain the needed data) would determine that nodes participated in the execution returning 5 are dishonest. To narrow down on a particular node, the query parameters can request to return result set per each log file that is considered. Then, in the same manner, the result returned on each log file is evaluated against multiple executions of the query.

For efficiency, a node validating an execution of a query on a log file can return a hash value representing the data set returned from the log file which is compared to a calculated value on the query node. This process is exemplified in FIG. 7.

Figure 7:
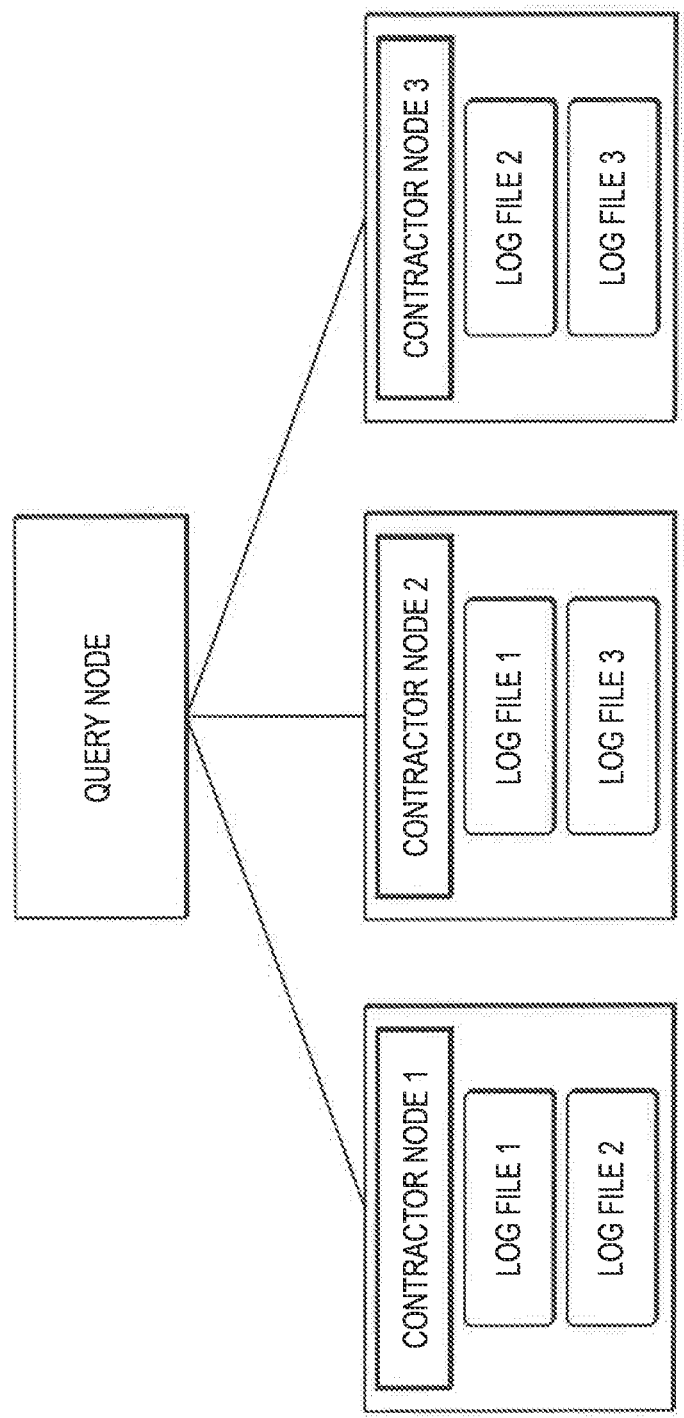
FIG. 7 is a block diagram illustrating storage of the same data over multiple nodes such that embodiments of the process can identify malicious members.

As shown in FIG. 7, when the ad hoc database is created, it connects a query node to 3 contractors' nodes. The query requires the log files 1 and 3 to be considered and is executed twice, the first execution against nodes 1 and 2 and returning the value 5 and the second execution against nodes 2 and 3 returning the value 6. Since the results are not identical, the query node executes the query again, requesting results at a file level. In this example, the returned value represents a SUM executed over a particular field in the time series data maintained in the log files. Therefore, in the first execution Node 1 returns the value 2 for file 1 and node 2 returns the value 3 for file 3 (3+2=5). In the second execution, node 2 returns the value 3 for file 1 and node 3 returns the value 3 for file 3 (3+3=6). Now it is apparent that the processing of file 1 by node 1 (returned value is 2) or node 2 (returned value is 3) is erroneous. The next process is done by the query node to identify a malicious node and is as follows:

1. The query node requests the log file showing different result from both nodes.
2. The query node calculates the hash value of the data to determine the authenticity of the data in the file. If the hash is different than the stored hash on the metadata, the node providing the inconsistent file is identified.
3. If a node was not identified in step 2, the query is executed by the query node on the log file, to determine the correct value (2 or 3) and identify the malicious node accordingly. As a query node may be a dishonest node, to remove a malicious node from the network, this process is validated by a different random query node on the network.

As demonstrated above, it is possible to identify dishonest nodes in the network. To minimize the number of dishonest nodes, a pay to play mechanism can be implemented. In this mechanism a node agrees to pay penalty if it would be found that data or queries maintained by the node are corrupted or if the node would not be available during the contract duration. The penalty would be enforced by a smart contract that would validate the integrity of the data maintained on the node or the node's response to a query by comparing the data or the query result to a different node that maintains the same data or process the same query over the same data. Or, if the node is not responsive, the smart contract can provide a time from which the penalty is triggered if the node remains unresponsive.

In the context herein, and as demonstrated above, the blockchain can be considered as an index to the ad hoc database. Rather than search over the entire data set, the search only considers the relevant log files and therefore the search over the data becomes more efficient. To process a query, the information in the blockchain (or in a local database derived from the data of the blockchain) is processed to narrow the data set that needs to be considered. If the data of a logical entity, such as a table, needs to be considered, the process considers the input and or output transactions to find the log files that needs to be considered. Any information on the transactions can be used to reduce the data set that needs to be considered. For example, if the additional information on the transactions includes the time range of the events maintained in the log file, a query process over events within a time interval will only process the relevant files. Therefore, when a query determines the relevant log files to consider, logs with time range which are not needed by the query can be ignored. If the time of the transfer of the log file to a contractor is included, a query process that considers the transfer time can identify the relevant files and make the query process more efficient than a process considering files irrespective to the time range. By one aspect, the blockchain is treated as an index of a database to allow efficient access to the data. By treating the blockchain as an index to the ad hoc database, information included in the blockchain transactions can be considered in the process that identifies the data set to consider. By another aspect, the information in the blockchain is maintained in a local database. The local database indexes the data derived from the blockchain for efficient access. A query process is using the local database to determine the data set to consider (such as the list of log files) such that the query process is more efficient than a process that considers the entire data set.

In the context herein, a log file maintained on a data node may include a local index. The local index allows efficient search over the data of a log file. With the local index, a query processed by a contractor can leverage the local index to identify the qualifying events in the log file, or to reduce the number of events being considered. In another embodiment, the log file is ordered by a particular vale of a particular attribute name. For example, the log file can be ordered by time. With this setup, if the search considers values relating to the attribute name used to order the events, the search process can be more efficient. For example, the events in the file are ordered by date and an index allows to find the first event (in the log file) of each date that appears in the events data. The search to find qualifying events in the log file considers a time range, the search process locates the first qualifying event in the log file that needs to be considered using the time values provided in the query. As the process is using the local index to locate events by date, once the first event is found, the search continues by evaluating the next ordered events in the log file. With this type of organization, the search terminates when the first event which is not in the time range is found. This search provided the events that needs to be considered to the process that executes the query on the contractor node.

The methods of herein provide the following:
1. Distribute computation—the data and processes are distributed over the network to independent edge nodes.
2. No central coordination—the input and output flow of data is based on peer-to-peer messages between members of the network.
3. Localize the dataset to use—dynamically and per query, connect a fixed subset of nodes, the subset contains the nodes that maintain the data that is needed to satisfy the query.
4. Apply massive parallelism—as multiple nodes contribute processing power to each query.

These features are required if the network is expected to grow to an infinite number of nodes and high degree of parallelism is required to provide performance and scalability when large amounts of data are considered. With this approach, there would be no limit to the amount of CPU and storage that can be added to the network and the number of connections that could be served. This is essential in order to support the increasing volumes of the IoT data.

In one embodiment, the methods herein utilize blockchain technology as a dynamic metadata layer to provide a consistent view of the metadata to all the members of the network despite its dynamicity. The oldest and most famous use case of blockchain is cryptocurrencies like Bitcoin where the blockchain is used to maintain a ledger of all the transactions and hence prevent the double spending. The use of blockchain herein is similar with subtle differences. For example, unlike cryptocurrencies that solely depend on the order of transactions to prevent double spending, in the ledger leveraged by embodiments the order in which transactions are registered does not need to be enforced. Despite the differences, the logic can be efficiently translated to what is acceptable by current general-purpose blockchains such as Bitcoin and Ethereum. The network herein can leverage the blockchain as a distributed data structure to maintain and augment the metadata without relying on any trusted third party. Embodiments rely on the following from the blockchain layer:
1. Provides metadata availability to all members of the network.
2. It is secure against a central point of failure since it is not managed by a third party.
3. Provides a way to update metadata by unrelated members while the data remains correct/consistent.
4. It provides the metadata through a self-managed platform.

In one embodiment, a blockchain is used as a metadata catalog to maintain information about databases, tables, and permissions on the chain, and, we extend the information such that a) given a table, the log files that make the table's data are identified, and b) given a log file, the contractors that store the log file data are available. As the availability of the chain is given, this approach makes the metadata available to all members of the network. In practice, each member node can retrieve the information once, from the chain, and update a local database with the information such that the metadata is locally available. Nodes in the network can store part or the entire history of the blockchain locally and have the mechanisms to sync when a new block is added to the chain.

The physical representation of the metadata is using the inherent blockchain mechanisms—in the approach herein, we represent objects such as tables, columns, and log files on the chain as addresses. Moreover, we use transactions to represent relations. These transactions are using a special token called Rcoin. A transfer of a Rcoin from one address to another represents a relation between the objects (and each object is represented by an addresses). Using addresses and Rcoin transactions, embodiments expose the metadata information. As the approach is leveraging the existing functionalities of the monetary transactions of the blockchain, a variety of blockchains can be used.

Examples: Each table, column, log file, contractor, are represented by a unique address. A transfer of Rcoins from a table to the columns defines the structure of the table. A transfer of Rcoins from a table to the log files determines the data that is assigned to the table. A transfer of Rcoins from a log file to contractors determines that the file is stored with the specific contractors. A transfer of Rcoins from a table to the users determines the users that are permitted to process the data of the table.

In a different implementation, the blockchain maintains part of the metadata with information allowing to locate details of the metadata. This approach can be used to minimize the amount of data that needs to be updated on the blockchain.

These types of transactions serve the different members and make the network operational as follows:

First, users of the network create tables. When data is generated, it is distributed to the network using the bidding process and is assigned to one or more tables (i.e. based on the configuration of the edge node where the data is generated). Therefore, outcomes of the bidding process include transactions describing the distributions of the files to contractors and assignment of each file to one or more tables.

As the blockchain provides eventual consistency among all members, the contractor retrieves the same schema from the blockchain and creates the table on the local DBMS. When the contractor receives data, he assigns or loads the data to the table. The query node is using the blockchain in the following manner—given a query, the contractors who maintain the data that needs to be evaluated are retrieved. This information is provided from the chain (using the relations—tables to files and files to contractors) or from registries that are located by the information on the blockchain and leveraging additional information in the query (such as time range, device id, location, etc.). When the contractors are determined, the query node connects to the contractors' nodes, sends the query to the contractors and aggregates the returned results to provide a unified reply.

The processes operating with the blockchain:
1. Relation descriptor—provides a mechanism to represent relations in the blockchain. Objects in the blockchain are represented by addresses (sometimes called accounts) and relations between objects are represented as transfers of Rcoins between the addresses. When a relation is represented, additional information which depends on the relation can be added to the transaction. Examples of relations are summarized in FIG. 8.
2. The chain extractor—provides a mechanism to extract the information and relations represented by the chain at any time and updates a local database accordingly.

Each member in the network is able to retrieve and query the metadata. The metadata provides, for the producer node, the information to facilitate the bidding process and distribute the data. For the contractor node it describes the structure of the tables to use with each log file received. For the query node it provides the information needed to execute the query. In addition, the blockchain describes permissions to users and is used to authenticate the data. As different unrelated parties update the blockchain (users define tables, create and distribute data, assign permissions etc.), each user needs to retrieve the information from the blockchain and synchronize with updates to the blockchain. The extractor is a process that extracts the chain and update the information on a local database. The process allows to extract the data from the place where the previous extraction ended such that the process is dynamic, and the local database is updated with as small as possible delay after the update of the chain. This process evaluates new blocks that are propagated in the network and updates the local database to represent the changes to the metadata that are included in the new blocks.

Network setup for producers of big data:

The network is structured such that different nodes can download the software packages and join the network. The role of a node is determined by the software executed and the same node can have multiple roles. Similarly, a portion of the network can be configured such that data producers and contractors are using the same nodes or sharing a local network. This is especially relevant for IoT devices (such as surveillance cameras) that create large amount of data at high rate. Moreover, some applications require to have a large number of IoT devices to work together in a local network which effectively generates a large amount of data together.

For example, a jet engine generates 2 TB of data a day. To increase the efficiency of the network and avoid uploading large amounts of data through the Internet, the data producers can manage their data or choose their corresponding contractors. Using this approach, data producers can choose contractors in their local network and the local network and the contractors' nodes on the local network can be configured such that they provide the needed SLA. These local contractors can effectively aggregate the data, compress the data, and makes the aggregated data available to broader users (i.e., data consumers) of the data.

As our approach is based on bringing the query to the data rather than bringing the data to a centralized database, keeping the data at rest next to where it was originated is ideal if the edge device generates massive amounts of data (this is in line with the broader vision of the edge computing paradigm). When this type of data is generated, only the metadata updates are transferred over the Internet, and these are many orders of magnitude smaller than the actual data. As explained in this document, these metadata updates are sufficient to locate the contractors to whom a query needs to be shipped, and this is done while the large volume of data is resident.

With that it is possible to execute SQL queries over the data. For example, the average temperature of the engine in the last 2 hours of the flight or a query to determine the max temperature in all the engines in the fleet in the last hour can be executed. These queries would be performed at high performance as the queries are sent to the nodes which maintain the relevant data.

Therefore, to support cases generating huge data sets, the data owner would configure a portion of the network such that the large unstructured data remains on the edge where it is collected. The outcome is similar to a database with a structured table that maintains a column with a value that is a link to a location of a large object.

As miners add new blocks to the chain and the changes propagated in the network over time, different users may issue conflicting Rcoins transactions. For example, two members may update the same column of a table by each issuing a transaction such as Table→Column. In some ways, it is similar to the double spending problem and can be resolved in the same way a double spending issue is resolved.

Because of the eventual consistency, the system needs to address inconsistencies when members of the network interact. There are two types of inconsistencies that are of primary concern:
1. Schema inconsistencies. A contractor interacts independently with producer nodes and query nodes. In either of these interactions, if the contractor is using a different version of the schema than the producer or query node, errors may occur. For example, a query may assume the existence or lack of existence of particular columns, for which the contractor is unaware, since the contractor is using a different version of the same schema. The contractor will either fail to parse the query or return incomplete or inaccurate data.
2. Data inconsistencies. Data may be added or removed from a table prior to the contractor that serves queries over that table becoming aware of the addition or removal. Again, this may result in the contractor returning incomplete or inaccurate data.

To solve this problem, the block-chain serves as a deterministic log of state changes to the schema of a table and the set of log-files that compose the table. Whenever there are inconsistencies between contractors and producer or query nodes, this only means that one of them has an older version, and the other one a newer version. Thus all consistencies can be resolved by having whichever side that has the newer version wait until the side with the older version catches up. Some contractors may choose to keep around older versions of state—this enables them to immediately serve query requests against older versions without rejecting the query and waiting for the query node to reissue the query against a more recent state.

By one embodiment, the following process is used to detect version inconsistencies:
1. Each object is assigned with version ID which is modified as a counter each time the object is modified.
2. When a process between two nodes is schema dependent, the ID is added to the messages transferred and is used to identify the inconsistent state.

An optimization to minimize the problem of inconsistent views is to wait for the chain to reach consensus before updating the local database. This can ensure that all the parties will update to a same version roughly at the same time.

Tables can be created by any user of the network and are represented in a catalog. The catalog can be stored in many ways as long as it is available to all the members of the network. In one embodiment the blockchain is used as an anchor to the catalog, and the catalog is distributed among the participating contractors such that a contractor that services data, maintains the portion of the catalog that is relevant to the data it is servicing. Using a different implementation, the catalog is maintained by the blockchain. In another implementation, the catalog is contained in the blockchain. A table represents a need to (logically) organize the data in a particular way and is declared by updating the catalog to represent the table. One embodiment differentiates between "private tables" where users create tables for their own use, and "public tables" that are created as an invitation to other users to provide data. Public tables can also allow permitted users to modify the schema. This approach can be extended to provide mechanisms to support consensus-based schemas. For example, a change to a schema would require majority approval and it can also be related to a payment to the members using the schema that are impacted by the change. Public tables can be also used by parties as a way to request data and data owners would be motivated to contribute data as they would be rewarded when queries are executed.

Embodiments herein are highly scalable platforms that can store, distribute and process very large data sets across hundreds and thousands of inexpensive servers that operate in parallel. The performance and scaling are based on being able to efficiently and dynamically identify a subset of nodes that form the entire cluster from which the query results can be derived. This process defines the subset of the data (from the entire IoT data) to consider, and it forms, by connecting the nodes that maintains the subset of the data, an on-the-fly, clustered database. As the subset of the data is distributed among the nodes of the on-the-fly-database, each node in the clustered database maintains a subset of the subset of the data, which can be organized and indexed in a local database. Given a query, all the local databases in the clustered database are processing the query results in parallel and as if the processing is done in a single machine.

The ingestion is a non-issue as the data is prepared for queries on the contractor nodes, by loading the data to a local database, but without an impact on the overall network performance. There is a dependency on weak nodes in the ad-hoc cluster. If a contractor is slow to respond it would impact overall query performance. However, contractors commit to a SLA for the data that they serve. Therefore, it is important for the SLAs of the potential contractors for a query to be taken into consideration during the query optimization process prior to query processing. However, even with careful optimization, contractors may be slower than expected. Therefore, dynamic monitoring of query progress, along with dynamic switching and/or redundant processing on secondary contractors may become necessary.

For maximum parallelism, each contractor should process approximately the same amount of data (assuming each contractor has the same amount of performance). However, contractors that use faster data processing algorithms, or contractors with larger processing resources or faster storage can generally process a larger amount of data in the same period of time. The query optimization process needs to take all of this into consideration when choosing not only the contractors to be involved in query processing, but also the subsets of data that will be processed per contractor. For example, if contractor A contained the entire data set relevant to a query, and contractor B contained only the second half the data relevant to the query, and contractor A is known to be twice as fast as contractor B, then the first two thirds of the data should be processed by contractor A, and the final third by contractor B.

The processes herein consider the number of updates to the metadata when log files are distributed to the network as there is a limit to the number of transactions per second that a blockchain can process (we can assume that other updates, such as to the schema are negligent in volume). When a log file is distributed we update the chain to represent the logical relations (to the tables) and the physical relations (to the contractors maintaining the file). As the characteristics of the devices and smart meters are such that they generate the data continuously over long periods of time, and we can assume that for a particular data producer, the logical views are constant (at least for long intervals of time), we promote an approach where contracts between data producers and contractors are long term rather than per each newly created log file. With this approach, multiple files generated and delivered to contractors within a time interval are treated as a single log file. An example would be a contract for storage for data up to 1 GB that will be send over a period of up to a week. With this type of contract, a single update to the chain can represent many millions of time series events.

We can also consider vertical partitioning of the blockchain. With this approach we maintain an independent blockchain for a group of tables and therefore, assuming even distribution of the usage, the throughput is multiplied by the number of partitions. In some ways this type of partitioning is similar to having logical databases, which will be, using this approach, represented by the partitions, and the set of logical tables which will be, using this approach, represented by the objects and relations on the chain.

The network herein is advantageous over centralized databases. For the updates (inserts) of data, these are done with the contractors at the edge of the network without contentions and without the need to update the blockchain, whereas with a conventional database there is an inherent contention when massive amounts of data are loaded. For the queries, these do not depend on the blockchain. The distribution of the data and the query processing at the edge nodes provide high degree of parallelism resulting in high performance and scaling which are needed to support real time applications. Only changes to the metadata requires synchronization with the blockchain, but these are relatively rare and can be identified and addressed dynamically. This is similar to centralized databases whereas metadata changes are not addressed in real time.

Here is the explanation of the approach in the context of real time applications:

1. Only metadata is placed in blockchain. These are orders of magnitude less than the data and there are techniques to minimize these updates.
2. A data producer can establish a long term relationship with a contractor and the query node receives a real time data from it.
3. Queries access the metadata in the blockchain if they do not already know which contractors are serving the data that they need to query. Changes to the metadata are relatively rare.
4. Most of the time, queries will access a cache of the metadata instead of the current metadata in blockchain similar to Google that accesses the cache of the metadata to provide the search results.
5. The blockchain can serves only as an anchor to the metadata—if metadata is needed, the blockchain shows the contractors that maintain the needed metadata. In this setup, updates to the metadata are off chain.
6. This might result in the query accessing the wrong set of contractors in certain rare cases. In such rare cases, the contractors that they incorrectly access will inform that they are no longer serving this dataset and the query node will have to query blockchain to get the right set of contractors to access for this query.
7. Thus, most of the time, blockchain is not accessed during query time and real time applications are possible.
8. Having the metadata in blockchain enables powerful features on the platform that have double spend problems.

By one embodiment: the processes herein are not bounded by the inclusion performance of the blockchain. The insert of data and the queries processes do not need the latest updates of the blockchain. Only the local copy of the blockchain is required and it does not need to be updated with the most recent changes of the blockchain. Therefore, the approach herein is not bounded by the performance of the blockchain. Example: Device A contracts with contractor X to store its data in the next 2 months. The contract is registered on the blockchain. Before the contract expires (i.e. there is sufficient time for the blockchain to be updated and the changes to be reflected on the local copies of the blockchain), a new contract is done between device A and contractor Y. Therefore, when data is added or retrieved to and from the network, there is no dependency on the latest updates of the blockchain. This approach represents the distribution of the data on the blockchain prior and independently to the insert and query processes that need the updated data, and there is as much time as needed to reflect these changes on the local copies of the blockchain.

Therefore, in the distributed network herein, if a blockchain is used as the metadata layer, the blockchain represents contracts to distribute data. Before the expiration of a contract A, contract B is created to provide continues service to the data. The creation of contract B is done such that there is enough time for the information of contract B to be updated on the blockchain and be available to the nodes in the network before contract A expires.

Using the processes herein, physically, the data is distributed on nodes in the network but logically the data is organized in tables similar to traditional database models. Anyone can create a table with a defined schema and the schema is stored in a registry. Table owners grant permissions to data producers to contribute and upload their data into the table. They decide on the level of data protection and on the policies regarding access permissions for data consumers. Queries issued by a data consumer are first checked to have the corresponding access permissions (e.g., an access token), before they are executed against the table. In case data is encrypted, authorized data consumers are granted access to decryption keys.

Contractors need to process the data of a table but are not necessarily permitted to view the data, depending on the policies defined by the table owner. The processes herein offer two mechanisms for processing queries on confidential data. One mechanism leverages advanced cryptographic techniques to support processing of queries on encrypted data: contractors never have access to the raw table data, and only authorized consumers with the decryption keys can access the results. The other mechanism leverages Trusted Execution Environments, e.g., Intel SGX, to process the queries privately. For datasets with anonymity requirements, processes employ differential privacy techniques, to provide unlinkability of data input to individual data producers. Combined with the above secure query processing mechanisms, the processes herein can offer both confidentiality and anonymity.

Updates to the database schema and access control policies can only be performed by the table owners and are cryptographically protected on the blockchain. However, a table owner may take one of several forms. A table owner may be a single trusted entity who holds a private key that is used to authorize all updates to the schema and security policies. Alternatively, the table owner may be a group of partially trusted entities, a predefined quorum of which agrees upon any updates by submitting signed authorizations to the blockchain. For scenarios where no sufficiently trusted entities exist, a table owner may also be a smart contract that encodes a decentralized protocol for updating schema and security policies.

Different workflows often have different data protection requirements. The network herein provides the following 4× modes of data protection:

1. No Encryption—In this mode, data is considered not to be sensitive and it is stored in plaintext. Anyone can access the data without any restrictions. It is important that data owners are aware of the consequences of storing data in clear. Examples of such data can be data in the public domain, for instance air quality sensor readings across a city. Even for public domain data, however, the integrity and authenticity of the data may be important. Therefore, all stored data is digitally signed by the data producer to ensure that it cannot be modified by a malicious contractor.

2. Encryption—To restrict access to data by unauthorized parties, such as the data contractors, data can be encrypted. Encrypted data can only be accessed by authorized parties with access to decryption keys. More specifically, the data remains protected from the data contractor or in case of data leakage, as a result of system compromise. Embodiments therefore leverage efficient symmetric key encryption schemes, such as AES-GCM, which provide integrity protection and authenticity in addition to confidentiality. To process queries over encrypted data online, embodiments leverage Trusted Execution Environments (TEE), such as Intel SGX. A TEE exhibits a protected and secure memory and computation area, where no outside processes can gain access to them. To this end, the data encryption keys are made accessible to the Enclave, such that data outside TEE remains strongly encrypted and only within TEE it can be decrypted for further processing. Furthermore, the invention's TEE query processor uses decentralized information flow control (IFC) techniques similar to IFDB to ensure that submitted queries do not reveal information the data consumer is not authorized to access and that the query results only rely on authenticated data.

The query results are sent in encrypted form to the authorized data consumer. Leveraging TEEs allows us to ensure the correctness, completeness, and integrity of responses. Embodiments leverage the techniques introduced by VC3 to overcome the challenges of employing Intel SGX for the data analytics. Note that any design that involves a TEE requires trusting the chip manufacturers for building the TEEs correctly and without any backdoors or exploitable vulnerabilities. We anticipate the market for TEEs in the coming years to be more competitive with rigorous auditing decreasing the probability of any vulnerabilities and built-in backdoors.

3. Encryption with Encrypted Data Processing support—In the recent years, several practical encrypted data processing systems have been introduced that enable computations on encrypted data. In their core, they utilize a set of encryption schemes, such as partially homomorphic encryption and order-preserving encryption schemes, to support a wide range of queries. For instance, CryptDB, Monomi, and Tabs, are designed to augment relational databases to enable processing queries over encrypted data. Researchers have pointed out that these systems leak information that might result in disclosing the encrypted data. For instance, order-preserving encryption leaks per definition the order among encrypted data. With access to an older instance of encrypted data in plaintext, it is possible to create histograms over both encrypted and plaintext data and break the encryption. Hence, great care is required to employ order-preserving encryption to only data of high entropy, such as time-stamps. Moreover, alternative order-preserving encryption schemes, such as ORE, have been developed which bound the leakage. Alternative systems, such as Seabed, abandon order-preserving encryption schemes all together, and leverage only additive homomorphic schemes to build powerful data analytics over encrypted datasets. Seabed leverages an efficient symmetric-key based partially homomorphic encryption schemes to support a wide range of queries.

4. In one embodiment, no database index is built over encrypted columns. Hence, only temporal range queries over non-sensitive fields, such as timestamp are supported, transforming database model into a simple key-value storage model. Alternatively, other none-sensitive fields could be used for advanced queries, e.g., filtering, group by, etc. Gradually, we will add support for processing queries over encrypted data, such as building an encrypted index to serve statistical queries.

5. Differential Privacy—At times, it is desirable to allow inferring statistics about populations while preserving the privacy of individual data providers. One embodiment employs a modern differential privacy framework, to protect individual data providers while allowing data queries over the entire dataset.

Conceptually, differential privacy introduces controlled randomness (i.e., noise) into the data, while maintaining a defined quality of queries. The degree of added noise is set by the privacy budget, which defines the total allowed leakage and determines the total number of queries. A high privacy budget means a higher probability of leaking data, whereas a too low budget might render the query results useless. While initial schemes required a trusted database operator who enforced the privacy budget, embodiments may utilize more recent schemes, such as RAPPOR, which overcome this limitation via the randomized response technique where no raw data is collected. Hence, controlled noise is already included at data collection time. To this end, data contractors have no access to raw data and have no means to deanonymize the data. An example commonly used to describe this technique involves a sensitive question, such as "Are you a member of the Communist party?". Each participant flips a coin, and answers "yes", only if heads come up, but tell the truth otherwise. This way each participant enjoys strong deniability, as a yes could be due to the coin coming up heads. Afterwards, one can precisely compute the true number of "yes" answers, by calculating 2(Y−0.25), whereas Y stands for the proportion of "yes" responses. Note that if not careful designed, repetitive responses of the same question with the same answer could leak some information about the true answer. Hence, countermeasures are required in such cases to add more noise to data collection.

Embodiments support a fine-grained access control management systems that allows table owners to define table access policies. Embodiments use advanced blockchain-based Access Authorization framework introduced by Droplet. This framework overcomes the trusted third parties present in today's access control management systems and instead relies on the blockchain technology as the source of trust. Access policies are defined by the table owners and stored securely in the blockchain. Each query issued by a data consumer should carry a one-time access token (i.e., a proof of being granted access). Data contractors can build the global state of access permission from the blockchain. Before processing each query, they look up the access permissions, and only proceed if access was granted by the table owner.

A blockchain-based access control system, allows processes herein to avoid the security issues due to trusted intermediaries. Data consumers, data producers, table owners, and data contractors are each identified with blockchain addresses, which as well serve as identifiers in the access permissions. We leverage signature-based access tokens to allow principals who are granted access to make an access request. The signature-based access tokens are logged as proof of the access request and can be integrated in the monetization model of embodiments, which rewards data contractors for their computing and storage services.

This naturally comes with privacy challenges, as not all parties involved might be interested to publicly accessible access control policies. Embodiments address this issue with common cryptographic tools none from the blockchain community, such as stealth addresses to ensure the anonymity of included entities in the access control policies.

Trusted Execution Environments (TEE)

The emergence of trusted execution environments (TEEs), such as Intel Software Guard Extensions (SGX), has paved the way for alternative models of trusted computing that we also leverage in the processes of embodiments. Embodiments achieve fine-grained delegation without trust between the owner and delegate via integrated TEEs in our platform. This is a new and powerful tool that allows, in our context, the table owners to flexibly share and delegate access, as an alternative to our blockchain-based access control. This method additionally allows us to preserve the confidentiality of the defined access control permissions, as only within the TEE the access permissions are decrypted and they are stored encrypted otherwise.

Figure 9:
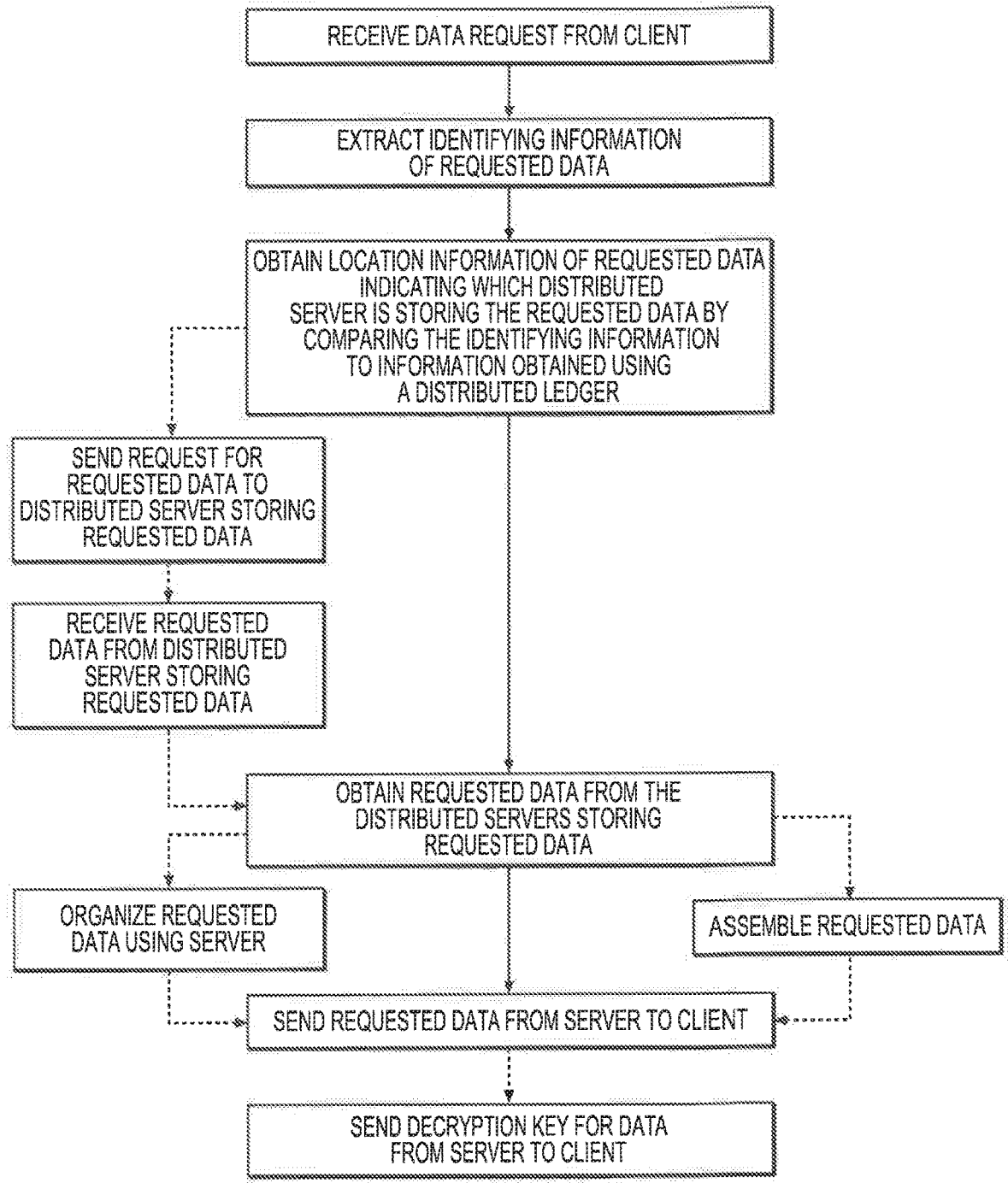
FIG. 9 is a flowchart of a method according to one embodiment.

FIG. 9 shows a method according to one embodiment. Such a method may be carried out on a coordinator server. The method includes receiving a data request from a client at the server and extracting identifying information of requested data from the data request, using the server. The method next includes obtaining location information of the requested data indicating which of the distributed servers is storing the requested data by comparing the identifying information to information obtained using a distributed ledger. The method next includes obtaining the requested data from the distributed servers storing the requested data; and sending the requested data from the server to the client.

In some embodiments, the method of FIG. 9 includes organizing the requested data using the server prior to sending the requested data to the client. In some embodiments, the requested data is encrypted, and the method further includes sending a decryption key for the data from the server to the client. In some embodiments, the decryption key is sent from the data owner to the client. In some embodiments, the requested data is divided among a plurality of the distributed servers, and the method further includes assembling the requested data before sending it to the client. In some embodiments, the method further includes, prior to sending the requested data from the server to the client: sending a request for the requested data to a distributed server storing the requested data; and receiving the requested data from the distributed server storing the requested data. In some embodiments the distributed serves are rewarded for processing the data. In some embodiments the coordinating server is rewarded for processing the data. In some embodiments the data owner is rewarded for contributing data.

Figure 10:
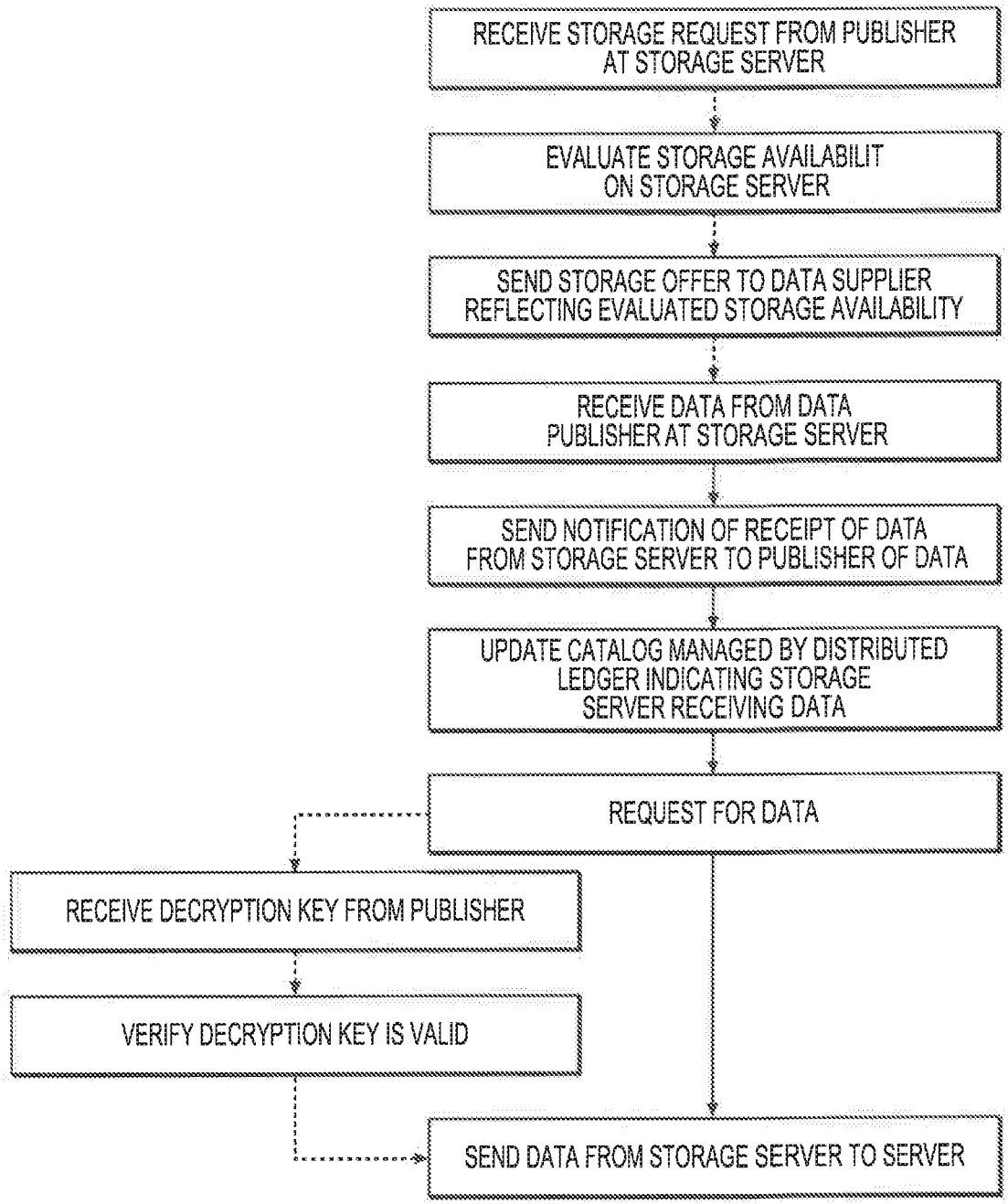
FIG. 10 is a flowchart of a method according to one embodiment.

FIG. 10 shows a method according to one embodiment. Such a method may be carried out on a storage or file server. The method includes receiving data from a data publisher at a storage server. The method further includes sending a notification of receipt of the data from the storage server to the publisher of the data. The method further includes updating a catalog managed by a distributed ledger indicating the storage server receiving the data. The method further includes receiving, at the storage server, a request for the data from a server. The method further includes sending the data from the storage server to the server.

In some embodiments, the method of FIG. 10 includes receiving a storage request from the publisher at the storage server; evaluating storage availability on the storage server; and sending a storage offer to the data supplier reflecting the evaluated storage availability. In some embodiments, the data is encrypted, and the method further includes, prior to sending the data from the storage server to the client: receiving a decryption key from the publisher; and verifying that the decryption key is valid. In some embodiments, the decryption key is sent from the data owner to the client. In some embodiments the distributed serves are rewarded for storing the data. In some embodiments the distributed serves are rewarded for processing the data. In some embodiments the coordinating server is rewarded for processing the data. In some embodiments the data owner is rewarded for contributing data.

The methods, processes, and software described herein can be performed on servers, computers, computer hardware, processors, smartphones, tablets, CPU's, and GPU's according to various embodiments. The software may be stored as instructions located in a memory (e.g. computer-readable non-transitory storage medium), and executed using the aforementioned hardware.

Although the invention has been described with reference to embodiments herein, those embodiments do not limit the invention. Modifications to those embodiments or other embodiments may fail within the scope of the invention.

What is claimed is:

1. A method of storing data that can be accessed over a network, comprising:
- receiving a storage request from a publisher at a storage server, wherein the publisher is an Internet of Things (IoT) device;
- evaluating storage availability on the storage server;
- sending a storage offer to the publisher reflecting terms of the storage;
- receiving data from the data publisher at the storage server, wherein the data is formatted as a plurality of log files transferred to the storage server;
- sending a notification of receipt of the data from the storage server to the publisher of the data;
- updating a catalog managed by a distributed ledger indicating the storage server receiving the data, wherein the distributed ledger stores, or allows to locate the information of the transfer of the data to the storage server, and transfers of other data to other storage servers on the network;
- receiving, at the storage server, a request for the data from a server; and
- sending the data from the storage server to the server.

2. The method of claim 1, wherein the distributed ledger is a blockchain.

3. The method of claim 1, wherein the data is encrypted, further comprising prior to sending the data from the storage server to the client:
- receiving a decryption key from the publisher; and
- verifying that the decryption key is valid.

* * * * *